US011286435B2

(12) United States Patent
DeLaney et al.

(10) Patent No.: US 11,286,435 B2
(45) Date of Patent: Mar. 29, 2022

(54) PROCESS FOR $C_{5+}$ HYDROCARBON CONVERSION

(71) Applicant: ExxonMobil Chemical Patents Inc., Baytown, TX (US)

(72) Inventors: John R. DeLaney, The Woodlands, TX (US); John J. Monson, Bend, OR (US); Teng Xu, Houston, TX (US); Kendele S. Galvan, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 17/282,993

(22) PCT Filed: Nov. 4, 2019

(86) PCT No.: PCT/US2019/059695
§ 371 (c)(1),
(2) Date: Apr. 5, 2021

(87) PCT Pub. No.: WO2020/096977
PCT Pub. Date: May 14, 2020

(65) Prior Publication Data
US 2021/0340450 A1     Nov. 4, 2021

Related U.S. Application Data

(60) Provisional application No. 62/757,022, filed on Nov. 7, 2018.

(30) Foreign Application Priority Data

Jan. 16, 2019  (EP) ..................................... 19152175

(51) Int. Cl.
*C10G 69/06*     (2006.01)
*B01D 3/14*      (2006.01)
(Continued)

(52) U.S. Cl.
CPC ............. *C10G 69/06* (2013.01); *B01D 3/143* (2013.01); *B01J 19/245* (2013.01); *C10J 3/72* (2013.01);
(Continued)

(58) Field of Classification Search
CPC ............. C10G 69/06; C10G 2300/202; C10G 2300/301; C10G 2300/308;
(Continued)

(56) References Cited

U.S. PATENT DOCUMENTS

| | | |
|---|---|---|
| 2014/0061100 A1 | 3/2014 | Lattner et al. |
| 2015/0315496 A1 | 11/2015 | Soultanidis et al. |
| 2015/0344785 A1 | 12/2015 | Soultanidis et al. |

OTHER PUBLICATIONS

U.S. Appl. No. 17/282,418, filed Apr. 2, 2021 Entitled "Process for C5+ Hydrocarbon Conversion" Delaney et al.
(Continued)

*Primary Examiner* — Randy Boyer
*Assistant Examiner* — Juan C Valencia

(57) ABSTRACT

In some examples, a vapor phase product and a liquid phase product can be separated from a heated mixture that includes steam and a hydrocarbon. The vapor phase product can be steam cracked to produce a steam cracker effluent. The steam cracker effluent can be contacted with a quench fluid to produce a cooled steam cracker effluent. The steam cracker effluent can be at a temperature of >300° C. when initially contacted with the quench fluid. A tar product and a process gas that can include ethylene and propylene can be separated from the cooled steam cracker effluent. The tar product can be hydroprocessed to produce a first hydroprocessed product. A hydroprocessor heavy product and a utility fluid product can be separated from the first hydroprocessed product. The quench fluid can be or include at least a portion of the utility fluid product.

25 Claims, 3 Drawing Sheets

(51) Int. Cl.
  *B01J 19/24* (2006.01)
  *C10J 3/72* (2006.01)
(52) U.S. Cl.
  CPC . *B01J 2219/0004* (2013.01); *C10G 2300/202* (2013.01); *C10G 2300/301* (2013.01); *C10G 2300/308* (2013.01); *C10G 2300/4006* (2013.01); *C10G 2300/4012* (2013.01); *C10G 2300/4018* (2013.01); *C10J 2300/16* (2013.01)
(58) Field of Classification Search
  CPC .... C10G 2300/4006; C10G 2300/4012; C10G 2300/4018; C10G 69/00; C10G 9/36; C10G 65/02; C10G 75/00; B01D 3/143; B01J 19/245; B01J 2219/0004; C10J 3/72; C10J 2300/16; C10J 3/00
  See application file for complete search history.

(56) References Cited

OTHER PUBLICATIONS

U.S. Appl. No. 17/281,744, filed Mar. 31, 2021 Entitled "Process for C5+ Hydrocarbon Conversion" Delaney et al.
U.S. Appl. No. 17/284,598, filed Apr. 12, 2021 Entitled "Process for C5+ Hydrocarbon Conversion" Osby et al.

PROCESS FOR C$_{5+}$ HYDROCARBON CONVERSION

CROSS-REFERENCE TO RELATED APPLICATIONS

This application is a US national phase application of PCT Application No. PCT/US2019/059695 having a filing date of Nov. 4, 2019, which claims priority to and the benefit of U.S. Provisional Application No. 62/757,022 having a filing date of Nov. 7, 2018 and European Patent Application No. 19152175.6 having a filing date of Jan. 16, 2019, the disclosures of all of which are incorporated herein by reference in their entireties.

FIELD

Embodiments disclosed herein generally relate to processes for C$_{5+}$ hydrocarbon conversion. More particularly, the processes relate to steam cracking a feed containing C$_{5+}$ to hydrocarbons, cooling a steam cracker effluent, and decreasing fouling during transport of the cooled steam cracker effluent and/or during separation of products therefrom.

BACKGROUND

Pyrolysis processes, e.g., steam cracking, convert saturated hydrocarbons to higher-value products, e.g., light olefins such as ethylene and propylene. In addition to these higher-value products, however, pyrolyzing hydrocarbons also produces naphtha, gas oil, and a significant amount of relatively low-value heavy products such as pyrolysis tar. Pyrolysis tar is a high-boiling, viscous, and reactive material that includes complex, ringed and branched molecules that tends to polymerize and foul equipment, which makes the tar difficult to process and transport.

Generally the effluent recovered from a pyrolysis process, such as steam cracking, is cooled by contacting the effluent directly and/or indirectly with a quench fluid such as hydrocarbon, water and/or steam. Cooling the effluent, however, can cause higher molecular weight constituents, e.g., asphaltenes, to precipitate out of the effluent and cause fouling within process equipment. For example, the precipitation of the higher molecular weight constituents can cause fouling within a primary separator (typically called a primary fractionator when the separation includes fractionation) that is typically used to separate various products, such as process gas, steam cracker naphtha (SCN), steam cracker gas oil (SCGO), steam cracker tar (SCT), etc., from the cooled steam cracker effluent. Conventional quenching and fractionation processes are disclosed, e.g., in U.S. Patent Application Publication No. US2014/0061100.

There is a need, therefore, for improved processes and systems for reducing fouling during the cooling of steam cracked hydrocarbons and/or for reducing fouling during the separation of steam cracker products.

SUMMARY

Processes and systems for C$_{5+}$ hydrocarbon conversion are provided. In some examples, the process can include separating a vapor phase product and a liquid phase product from a heated mixture that can include steam and a hydrocarbon. The vapor phase product can be steam cracked to produce a steam cracker effluent. The steam cracker effluent can be contacted with a quench fluid to produce a cooled steam cracker effluent. The steam cracker effluent can be at a temperature of ≥300° C. when initially contacted with the quench fluid. A tar product and an upgraded steam cracker effluent that can include ethylene and propylene can be separated from the cooled steam cracker effluent. The tar product can be hydroprocessed to produce a first hydroprocessed product. A hydroprocessor heavy product and a utility fluid product can be separated from the first hydroprocessed product. A process gas, at least one primarily liquid-phase side stream (e.g., SCN and/or SCGO), and a bottoms product (e.g., a bottoms stream) can be separated from the upgraded steam cracker effluent, e.g., in a primary fractionator. The quench fluid can be or include a first portion of the utility fluid product, but does not include the bottoms stream.

In other examples, the process can include separating a vapor phase product and a liquid phase product from a heated mixture that can include steam and a hydrocarbon. The hydrocarbon can include naphtha, gas oil, vacuum gas oil, waxy residues, atmospheric residues, residue admixtures, crude oil, or a mixture thereof. The vapor phase product can be exposed to a temperature of ≥400° C. under steam cracking conditions to produce a steam cracker effluent that is at least partially in a gas phase. The steam cracker effluent can be contacted with a quench fluid to produce a cooled steam cracker effluent, wherein the steam cracker effluent is at a temperature of ≥300° C. when initially contacted with the quench fluid. At least a portion of the gas phase can condense into a liquid. A tar product and an upgraded steam cracker effluent that can include ethylene and propylene can be separated from the cooled steam cracker effluent. The tar product can be hydroprocessed to produce a first hydroprocessed product. A hydroprocessor heavy product and a utility fluid product can be separated from the first hydroprocessed product. The quench fluid can be or include a first portion of the utility fluid product. The utility fluid product can include (a) ≥1 wt. % of 1.0 ring class compounds; (b) ≥5 wt. % of 1.5 ring class compounds; (c) ≥5 wt. % of 2.0 ring class compounds; and (d) ≥0.1 wt. % of 5.0 ring class compounds, wherein the weight percent values of (a), (b), (c), and (d) are based on a weight of the utility fluid product. The cooled steam cracker effluent can include about 5 wt. % to about 80 wt. % of the utility fluid, based on a combined weight of the quench fluid and the steam cracker effluent. In these and certain other examples, the quench fluid is not derived from the upgraded steam cracker effluent, e.g., the quench fluid is substantially free of a bottoms product obtained by fractionating the upgraded steam cracker effluent.

In some examples, the system can include a steam cracker, a first separator, a first transfer line, a second separator, a first hydroprocessing unit, a third separator, and a fourth separator. The steam cracker can be configured to indirectly heat a mixture that includes steam and a hydrocarbon to produce a heated mixture and to steam crack a vapor phase product separated from the heated mixture to produce a steam cracker effluent. The first separator can be configured to separate the vapor phase product and a liquid phase product from the heated mixture. The first transfer line can be configured to introduce a first portion of a utility fluid product to the steam cracker effluent at a location where the steam cracker effluent is at a temperature of ≥300° C. to produce a cooled steam cracker effluent. The second separator can be configured to separate a tar product and an upgraded steam cracker effluent that can include ethylene and propylene from the cooled steam cracker effluent. The first hydroprocessing unit can be configured to hydroprocess the tar product to produce a first hydroprocessed product. The third separator can be configured to separate a second vapor phase product and a second liquid phase product from the first hydroprocessed product. The fourth separator can be configured to separate a hydroprocessor heavy product and the utility fluid product from the second liquid phase product. A primary fractionator can be used to separate other products from the upgraded steam cracker effluent, e.g., a bottoms stream and a process gas. The bottoms stream can be conducted away as a fuel oil, e.g., without hydroprocessing. The process gas can be conducted away, e.g., for recovery of ethylene, propylene, and other steam cracker products and co-products.

BRIEF DESCRIPTION OF THE DRAWINGS

The drawings described herein are for illustrative purposes only of selected embodiments and not all possible implementations, and are not intended to limit the scope of the present disclosure. Corresponding reference numerals indicate corresponding parts throughout the drawings.

DETAILED DESCRIPTION

Figure 1:
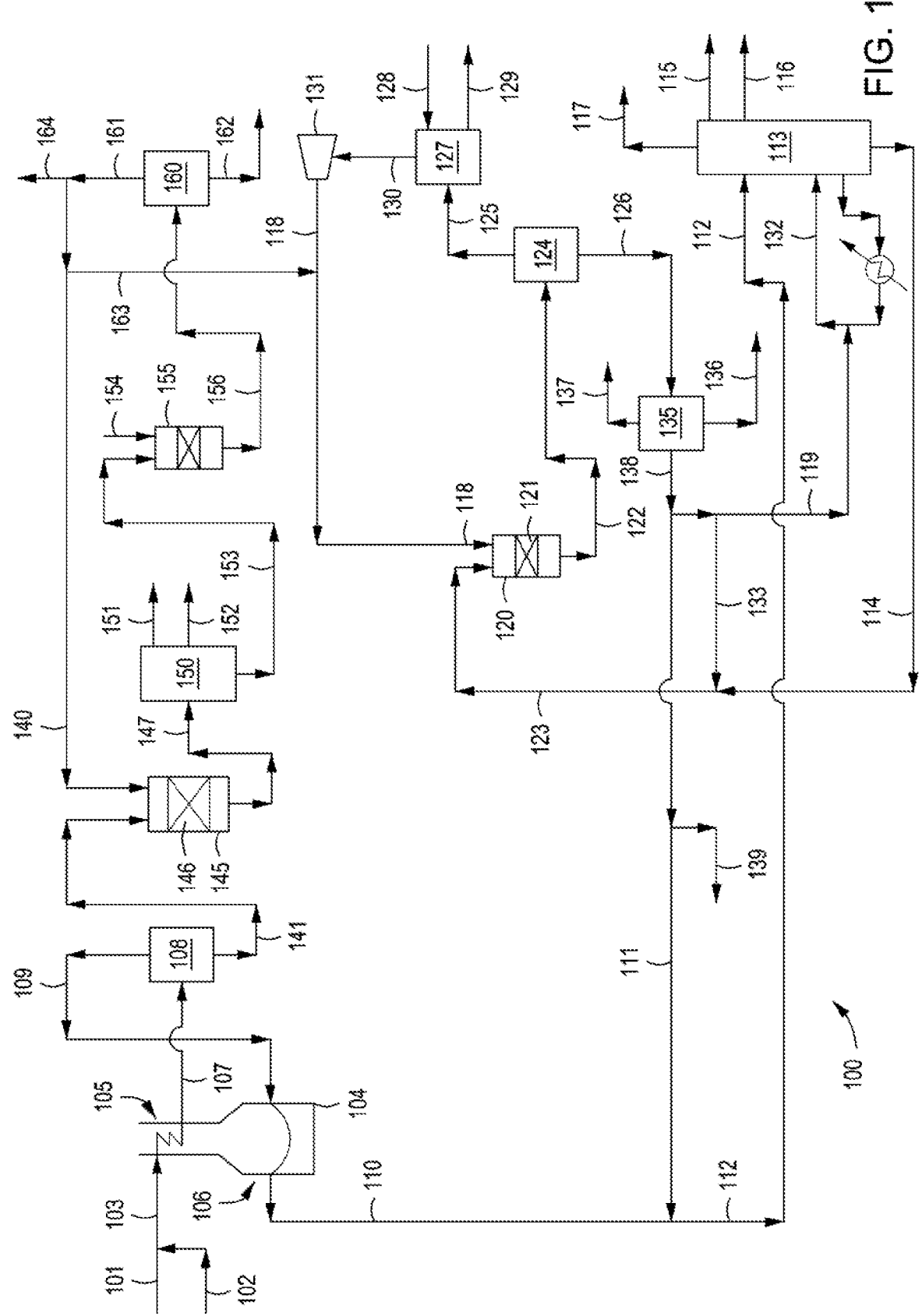
FIG. 1 depicts a schematic of an illustrative system for steam cracking hydrocarbons, cooling a steam cracker effluent, and separating products therefrom, according to one or more embodiments described.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the Figures. Moreover, the exemplary embodiments presented below can be combined in any combination of ways, i.e., any element from one exemplary embodiment can be used in any other exemplary embodiment, without departing from the scope of the disclosure.

One or more hydrocarbons, e.g., a feed containing $C_{5+}$ hydrocarbons, can be mixed, blended, or otherwise combined with water, steam, or a mixture thereof and heated to produce a heated mixture. A vapor phase product and a first liquid phase product can be separated from the heated mixture. The vapor phase product can be heated and subjected to steam cracking conditions to produce a steam cracker effluent. The steam cracker effluent can be cooled to produce a cooled steam cracker effluent. For example, the steam cracker effluent can be contacted with a quench fluid that can be or include a utility fluid product to produce a cooled steam cracker effluent. In some examples, the steam cracker effluent can be at a temperature of ≥300° C. when initially contacted with the quench fluid. A tar product and an upgraded steam cracker effluent can be separated from the cooled steam cracker effluent. The tar product can be hydroprocessed to produce a hydroprocessed product or "first" hydroprocessed product. In some examples, the tar product can be hydroprocessed in the presence of the utility fluid to produce the first hydroprocessed product. A hydroprocessor heavy product and the utility fluid product can be separated from the first hydroprocessed product. In some examples, the hydroprocessor heavy product can be further processed, e.g., by additional hydroprocessing, to produce a low-sulfur fuel oil boiling-range product that is suitable for use as a fuel oil (a first fuel oil) or a blending constituent thereof.

It has been surprisingly and unexpectedly discovered that directly contacting the steam cracker effluent with the quench fluid that can be or include the utility fluid product or "first portion" of the utility fluid product can decrease or prevent fouling within the equipment, e.g., pipes and heat exchangers, through which the steam cracker effluent can be conveyed or otherwise transported, e.g., to a separator for separation into the tar product and the ethylene and/or the propylene. Those skilled in the art will appreciate that the amount of the quench fluid contacted with the steam cracker effluent should be sufficient to cool the steam cracker effluent to facilitate separation of the desired products in a primary fractionator. Although the amount of quench fluid needed to do this can vary considerably from facility to facility, the quench fluid: steam cracker effluent weight ratio is typically in the range of from about 0.1 to about 10, e.g., 0.5 to 5, such as 1 to 4. The desired weight ratio in a particular instance can be determined, e.g., from factors such as the amount of steam cracker effluent to be cooled, the temperature of the steam cracker effluent at the quenching location, the composition and thermodynamic properties (e.g., enthalpy, $C_P$, etc.) of the quench fluid and the steam cracker effluent, the desired temperature of the quench fluid-steam cracker effluent mixture (namely the cooled steam cracker effluent) at the primary fractionator inlet, etc. For example, in certain aspects the cooled steam cracker effluent includes quench fluid in an amount in the range of about 5 wt. % to about 95 wt. %, about 25 wt. % to about 90 wt. %, or about 50 wt. %, or about 80 wt. %, based on the weight of the cooled steam cracker effluent. In some examples, the quench fluid can be the utility fluid product or "first portion" of the utility fluid product. In other examples, the quench fluid can be a mixture of the first portion of the utility fluid product and one or more additional fluids. The quench fluid can typically be a mixture that can include at least a portion of the utility fluid product and optionally hydroprocessed tar, steam cracker naphtha, steam cracker gas oil, or any mixture thereof. In certain aspects, the quench fluid comprises ≤0.1 wt. % of primary fractionator bottoms based on the weight of the quench fluid, e.g., ≤0.01 wt. %, or ≤0.001 wt. %. For example, the quench fluid can be substantially free of primary fractionator bottoms. In these and certain other aspects, the quench fluid can be substantially free of products and/or co-products derived from the upgraded steam cracker effluent. Although it is not typical, the quench fluid can include or further includes water (e.g., steam) and other aqueous compounds. In some examples, the quench fluid can include the utility fluid product in an amount ≥10 wt. %, such as ≥25 wt. %, or ≥50 wt. %, or ≥75 wt. %, or in the range of about 25 wt. % to about 100 wt. %, or about 50 wt. % to about 100 wt. %; the weight percent values being based on a weight of the quench fluid.

Although all of the utility fluid product can be utilized as quench fluid or a blending constituent thereof, this is not required. Typically, the utility fluid product is divided into a plurality of portions, e.g., with a first portion utilized as the quench fluid or a blend component of the quench fluid, a second portion conveyed to the primary fractionator, and a third portion utilized as a diluent/hydrogen donor solvent during steam cracker tar hydroprocessing. In these examples, the quench fluid can include a first portion of utility fluid product in an amount ≥10 wt. %, such as ≥25 wt. %, or ≥50 wt. %, or ≥75 wt. %, or in the range of about 25 wt. % to about 100 wt. %, or about 50 wt. % to about 100 wt. %, the weight percent values being based on a weight of the quench fluid. In some examples, the cooled steam cracker effluent can include the first portion of the utility fluid product in an amount of about 5 wt. % to about 95 wt. %, about 5 wt % to about 80 wt %, about 25 wt. % to about 90 wt. %, or about 50 wt. % to about 80 wt. %, based on the weight of the cooled steam cracker effluent. In other examples, the cooled steam cracker effluent can include about 5 wt. % to about 80 wt. %, about 10 wt % to about 75 wt %, about 15 wt. % to about 70 wt %, or about 20 wt % to about 65 wt % of the utility fluid or the first portion of the utility fluid, based on a combined weight of the quench fluid and the steam cracker effluent.

It has also been surprisingly and unexpectedly discovered that the utility fluid product or "second portion" of the utility fluid product can be contacted with the steam cracker effluent or the cooled steam cracker effluent within a separator, e.g., a fractionator, to decrease or prevent fouling within the separator. In some examples, the cooled steam cracker effluent can be contacted with the second portion of the utility fluid product during separation of the tar product and the upgraded steam cracker effluent from the cooled steam cracker effluent at a weight ratio of the second portion of the utility fluid product to the cooled steam cracker effluent that is ≥0.01:1, e.g., ≥0.1:1, such as ≥1:1, or ≥5:1, or in the range of about 0.5:1 to about 4:1, or about 1:1 to about 4:1. The weight of the cooled steam cracker effluent equals the sum of the weight of the steam cracker effluent plus the weight of the quench fluid combined therewith.

The utility fluid product or "third portion" of the utility fluid product can also be contacted with the tar product prior to and/or during hydroprocessing of the tar product to produce a tar-utility fluid mixture that can be hydroprocessed with a decreased amount of fouling or no fouling within the hydroprocessing unit and/or with a decreased rate of deposition of coke and/or other heavy hydrocarbons on the catalyst used to hydroprocess the tar product, as compared to hydroprocessing the tar product alone, i.e., without the utility fluid product mixed therewith. In some examples, the amount of the third portion of the utility fluid product contacted with the tar product can produce a tar-utility fluid mixture that includes about 5 wt. %, about 10 wt. %, or about 15 wt. % to about 50 wt. %, about 60 wt. %, about 70 wt. %, about 80 wt. %, about 85 wt. %, about 90 wt. %, or about 95 wt. % of the third portion of the utility fluid product, based on a combined weight of the third portion of the utility fluid product and the tar product.

In some examples, a first portion of the utility fluid product can be contacted with the steam cracker effluent as the quench fluid or as a portion of the quench fluid to produce the cooled steam cracker effluent and a second portion of the utility fluid product can be contacted with the cooled steam cracker effluent during separation of the tar product and the upgraded steam cracker effluent therefrom. In other examples, a first portion of the utility fluid product can be contacted with the steam cracker effluent as the quench fluid or as at least a portion of the quench fluid to produce the cooled steam cracker effluent, a second portion of the utility fluid product can be contacted with the cooled steam cracker effluent during separation of the tar product and upgraded steam cracker effluent therefrom, and a third portion of the utility fluid product can be contacted with the tar product prior to and/or during hydroprocessing of the tar product to produce a tar-utility fluid mixture that can be hydroprocessed. The first portion of the utility fluid product, the second portion of the utility fluid product, and the third portion of the utility fluid product can have the same or substantially the same composition as one another, e.g., as may be the case when these portions are divided or otherwise obtained from the same utility fluid source.

FIG. 1 depicts a schematic of an illustrative system 100 for steam cracking hydrocarbons, cooling a steam cracker effluent, and separating products therefrom, according to one or more embodiments. A hydrocarbon-containing feed, e.g., a feed containing $C_{5+}$ hydrocarbons, via line 101 and water, steam, or a mixture of water and steam via line 102 can be mixed, blended, combined, or otherwise contacted to produce a mixture via line 103. The mixture can include about 10 wt. % to about 95 wt. % of the water and/or steam, based on a combined weight of the hydrocarbon and the water and/or steam. In some examples, the hydrocarbon in line 101 that can be mixed, blended, combined, or otherwise contacted with the water and/or steam in line 102 to produce the mixture in line 103 can be or include the hydrocarbons or hydrocarbon feedstocks disclosed in U.S. Pat. Nos. 7,993,435; 8,696,888; 9,327,260; 9,637,694; 9,657,239; and 9,777,227; and International Patent Application Publication No. WO 2018/111574.

The mixture in line 103 can be heated, e.g., to a temperature of about 200° C. to about 585° C., to produce a heated mixture. For example, the mixture in line 103 can be heated in a convection section 105 of a furnace 104 to produce the heated mixture via line 107. A vapor phase product or "first vapor phase product" and a liquid phase product or "first liquid phase product can be separated from the heated mixture by introducing the heated mixture via line 107 into one or more separators of a "first separation stage" 108. The first vapor phase product via line 109 and the first liquid phase product via line 141 can be recovered from the first separation stage 108. In some examples, the first separation stage 108 can be or include the separators and/or other equipment disclosed in U.S. Pat. Nos. 7,138,047; 7,090,765; 7,097,758; 7,820,035; 7,311,746; 7,220,887; 7,244,871; 7,247,765; 7,351,872; 7,297,833; 7,488,459; 7,312,371; 6,632,351; 7,578,929; and 7,235,705. Although steam can be used to strip additional hydrocarbon from the first liquid phase product to the first vapor phase product, e.g., by introducing steam into a lower region of separation stage 108, this not required. In certain aspects such steam stripping is not carried out, e.g., to lessen the amount of fouling in the separation vessel.

The first vapor phase product in line 109 can be heated to a temperature of ≥400° C., e.g., a temperature of about 425° C. to about 825° C., and introduced to a radiant section 106 of the furnace 104 to produce a steam cracker effluent, which can be conducted away via line 110. In some examples, the first vapor phase product in line 109 can be heated in the convection section 105 of the furnace 400 prior to introducing the vapor phase product to the radiant section 106 of the furnace 104. In some examples, additional water and/or steam can be mixed, blended, combined, or otherwise contacted with the vapor phase product before introducing the vapor phase product to the radiant section 106 of the furnace 104 for steam cracking. In some examples, the first vapor phase product in line 109 can be steam cracked according to the processes and systems disclosed in U.S. Pat. Nos. 6,419,885; 7,993,435; 9,637,694; and 9,777,227; and International Patent Application Publication No. WO 2018/111574.

The steam cracker effluent in line 110 can be mixed, blended, combined, or otherwise contacted with a quench fluid in line 111 to produce a cooled steam cracker effluent in line 112. It has been surprisingly and unexpectedly discovered that contacting the steam cracker effluent in line 110 with the quench fluid in line or "first transfer line" 111, which can be or include a first portion of the utility fluid product disclosed herein, can decrease or prevent fouling within the equipment, e.g., line 112 and a second separation stage 113, through and/or within which the steam cracker effluent or fractions thereof can be conveyed or otherwise transported. In some examples, the steam cracker effluent in line 110 can be at a temperature of ≥300° C., ≥400° C., ≥500° C., ≥600° C., or ≥700° C., or ≥800° C., or more. In certain aspects, the greatest temperature of the steam cracker effluent in line 110 can be in the range of about 425° C. to 850° C., e.g., about 450° C. to about 800° C., when initially contacted with the quench fluid in line 111. In some examples, the utility fluid product can be the same or similar to the utility fluids disclosed in U.S. Pat. Nos. 9,090,836; 9,637,694; and 9,777,227; and International Patent Application Publication No. WO 2018/111574.

The cooled steam cracker effluent via line 112 can be introduced into one or more separators of a "second separation stage" 113. For example, a tar product via line 114 and one or more additional products, e.g., steam cracker naphtha via line 115, steam cracker gas oil via line 116, and/or a process gas via line 117, can be recovered from the second separation stage 113. In some examples, products that can be separated from the process gas in line 117 can include, but are not limited to, a tail gas, ethane, ethylene, propane, propylene, crude $C_4$ hydrocarbons, or any combination thereof. The second separation stage 113 can be or include one or more fractionators, knockout drums, a combined quench tower and primary fractionator, a compressor, contaminant removal units, e.g., $CO_2$ and/or $H_2S$ removal units, acetylene converter, etc. In some examples, the products that can be separated from the cooled steam cracker effluent can be separated according to the processes and systems disclosed in U.S. Patent Application Publication No. 2014/0357923. Although at least a portion of the tar product can be used as a fuel, it is typically subjected to at least one hydroprocessing stage as shown, to produce products of greater utility.

It has also been surprisingly and unexpectedly discovered that the cooled steam cracker effluent can be contacted with the utility fluid product or "second portion of the utility fluid product" during separation of the tar product and the one or more additional products. In some examples, the second portion of the utility fluid product via line or "second transfer line" 119 can be introduced to a reflux or reboil line 132 recovered and recycled to the second separator 113. In other examples, not shown, the second portion of the utility fluid product via line 119 can be introduced directly to the second separator 113. In some examples, the material in the reflux or reboil line 132 can be at a temperature of ≥300° C. to about 500° C. when initially contacted with the second portion of the utility fluid product in line 119.

The tar product via line 114 and molecular hydrogen via line 118 can be introduced into one or more hydroprocessing stages (a tar hydroprocessor) 120 to produce a first hydroprocessed product via line 122. Although in certain aspects the tar product in line 114 can be introduced into the tar hydroprocessor 120 "as-is" (e.g., when sufficient utility fluid is introduced into separator 113 at an appropriate location to flux the tar of line 114), in other aspects it can be mixed, blended, combined, or otherwise contacted with the utility fluid or "a third portion of the utility fluid" via line or "third transfer line" 133 and a tar-utility fluid mixture via line 123 can be introduced into the tar hydroprocessor 120. The tar product or the tar-utility fluid mixture can be hydroprocessed in the tar hydroprocessor 120 in the presence of to the molecular hydrogen and a catalyst, e.g., a catalyst bed 121, under tar hydroprocessing conditions sufficient to produce the first hydroprocessed product via line 122. Illustrative processes and systems that can be used to hydroprocess the tar product or the tar-utility fluid mixture can include those disclosed in U.S. Pat. Nos. 9,090,836; 9,637,694; and 9,777,227; and International Patent Application Publication No. WO 2018/111574.

Tar hydroprocessing conditions typically include a temperature ("$T_T$") ≥200° C.; a total pressure ("$P_T$") ≥3.5 MPa, e.g., ≥6 MPa; a weight hourly space velocity ("$WHSV_T$") ≥0.2 $hr^{-1}$, ≥0.25 $hr^{-1}$, or ≥0.3 $hr^{-1}$ based on the weight of the tar product of line 114 or the tar-utility fluid mixture of line 123 that is subjected to the tar hydroprocessing; and a total amount of molecular hydrogen supplied to the tar hydroprocessor that is ≥1000 standard cubic feet per barrel of tar product or the tar-utility fluid mixture subjected to the tar hydroprocessing (178 S $m^3/m^3$). Conditions can be selected within the tar hydroprocessing conditions to achieve a 566° C.+ conversion of ≥20 wt. % substantially continuously for at least ten days at a molecular hydrogen consumption rate of about 2200 standard cubic feet per barrel of tar product in the tar-utility fluid mixture of line 123 (SCF/B) (392 S $m^3/m^3$) to about 3200 SCF/B (570 S $m^3/m^3$). In some examples, the tar hydroprocessing conditions can be the same or similar to the hydroprocessing conditions, e.g., the intermediate hydroprocessing conditions, disclosed in WO Publication No. WO2018/111574.

The first hydroprocessed product via line 122 can be introduced to one or more separators of a "third separation stage" 124 and a vapor phase product or "second vapor phase product" via line 125 and a liquid phase product or "second liquid phase product" via line 126 can be conducted away therefrom. The second vapor phase product via line 125 can be introduced into one or more upgrading units 127, e.g., one or more amine towers. For example, fresh amine via line 128 can be introduced to the upgrading unit 127 and a rich amine via line 129 can be recovered therefrom. A regenerated treat gas, which can be or include molecular hydrogen, via line 130 can be compressed in one or more compressors 131 to produce at least a portion of the molecular hydrogen in line 118.

The second liquid phase product via line 126 can be introduced to one or more separators of a "fourth separation stage" 135. Optionally, the functions of stages 124 and 135 can be carried out in one separation stage (not shown). In some examples, a hydroprocessor heavy product via 136, an overhead or vapor via line 137, and the utility fluid via line 138 can be recovered from the fourth separation stage 135. The utility fluid in lines 111, 119, and 133 can be supplied from the utility fluid in line 138. In some examples, excess or surplus utility fluid via line 139 can also be recovered from the system 100. The hydroprocessor heavy product via line 136, overhead or vapor via line 137, and the utility fluid product via line 138 can be separated from the first hydroprocessed product according to the processes and systems disclosed in U.S. Pat. Nos. 9,090,836; 9,637,694; 9,777,227; and International Patent Application Publication No. WO 2018/111574. In certain aspects, the utility fluid of line 138 can include partially hydrogenated 2-4 ring molecules, such as dihydroanthracene and tetralin. These molecules can readily transfer hydrogen radicals to reactive free radicals in steam cracker effluent (e.g., of line 110) to make stable products. An exemplary equation for the radical transfer is shown below:

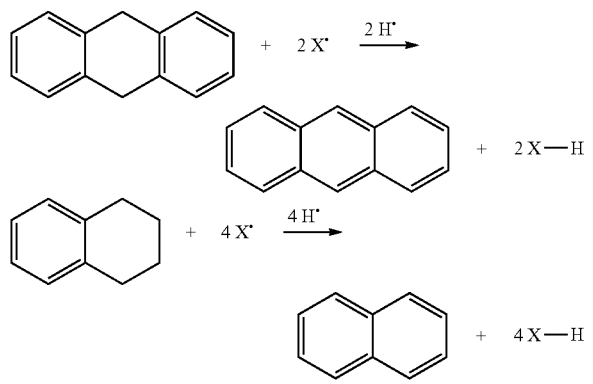

where X˙ refers to a radical species, and H˙ refers to a hydrogen radical. Since tar hydroprocessing generates excess utility fluid (i.e., beyond that needed as a flux/solvent during tar hydroprocessing), at least a portion of the excess utility fluid can be used as a quench oil to quench the effluent flowing from a pyrolysis furnace and/or a transfer line exchanger ("TLE"). The relatively high temperature during quench facilitates hydrogen transfer from the mid-cut to the free radicals. The mid-cut can also be used to mix with various effluent streams flowing from a separation apparatus (e.g., a primary fractionator). The concentration of the donatable hydrogen in a sample of the utility fluid and other characteristics of the utility fluid are disclosed in U.S. Patent Application No. 62/716,754. Typically, the quenching is carried out to decrease the temperature of the steam cracker effluent at the quench location (e.g., before and/or after a TLE) from an initial temperature $T_1$, e.g., in the range of 600° C. to 850° C., to a final temperature, $T_2$ e.g., in the range of 250° C. to 500° C. to slow down the reactions that lead to excessive coke and gas formation. Typically $T_1-T_2 \geq 100°$ C., e.g., $\geq 125°$ C., such as $\geq 150°$ C. The quenching typically results in the formation of a two-phase mixture, e.g., a mixture comprising (i) a vapor phase and (ii) a liquid phase containing steam cracker tar. The concentration of the donatable hydrogen in a sample of the utility fluid and other characteristics of the utility fluid are disclosed in U.S. Patent Application No. 62/716,754. Locations for carrying out the quenching are described in U.S. Patent Application Publication No. 2014/0061100, which is incorporated by reference herein in its entirety.

Returning to the first liquid phase product in line 141, in some examples, the first liquid phase product can be sold as a product. For example, the first liquid phase product in line 141 can be conducted away, stored, and/or sold or used as a fuel oil (relatively high sulfur compared to the first and/or second fuel oil) or a fuel blending component. In other examples, the first liquid phase product in line 141 can be further processed to produce one or more additional products. For example, the first liquid phase product via line 141 and molecular hydrogen via line 140 can be introduced to one or more second hydroprocessing units 145. The first liquid phase product can be hydroprocessed in the presence of the molecular hydrogen and a catalyst, e.g., catalyst bed 146, to produce a second hydroprocessed product via line 147. The second hydroprocessed product via line 147 can be introduced to one or more separators of a "fifth separation stage" 150 and two or more products can be separated therefrom. For example, a second fuel oil (typically low-sulfur) via line 151, a hydrocrackate via line 152, and/or a pitch via line 153 can be recovered from the fifth separation stage 150.

In some examples, the pitch via line 153 and an oxidant via line 154 can be introduced into one or more synthesis gas generation units 155 to produce a synthesis gas via line 156 that can include molecular hydrogen and carbon monoxide. Illustrative processes and systems that can be used to convert at least a portion of the pitch to the synthesis gas can include, but is not limited to, partial oxidation, steam reforming, etc. Conventional synthesis gas generation processes can be used, but the invention is not limited thereto.

In some examples, the pitch and an oxidant can be reacted at conditions sufficient to produce a synthesis gas that can include a mixture of molecular hydrogen and carbon monoxide. In some examples, reacting the pitch and the oxidant can include partially oxidizing the pitch in the presence of the oxidant and a catalyst at conditions sufficient to combust a portion of the pitch to produce a mixture that can include carbon dioxide, non-combusted pitch, and heat. In some examples, at least a portion of the non-combusted pitch can be reformed in the presence of the heat and the catalyst to produce the synthesis gas.

In some examples, the synthesis gas via line 156 can be introduced to one or more separators of a "sixth separation stage" 160 and molecular hydrogen via line 161 and non-hydrogen or substantially non-hydrogen gas, e.g., carbon monoxide, carbon dioxide, and/or water via line 162 can be conducted away therefrom. In some examples, a first portion of the molecular hydrogen in line 161 can be introduced via line 140 to the second hydroprocessing unit 145, a second portion of the molecular hydrogen in line 161 can be introduced via lines 163 and 118 to the first hydroprocessing unit 120, and/or a third portion of the molecular hydrogen in line 161 can be removed via line 164 from the system 100.

Figure 2:
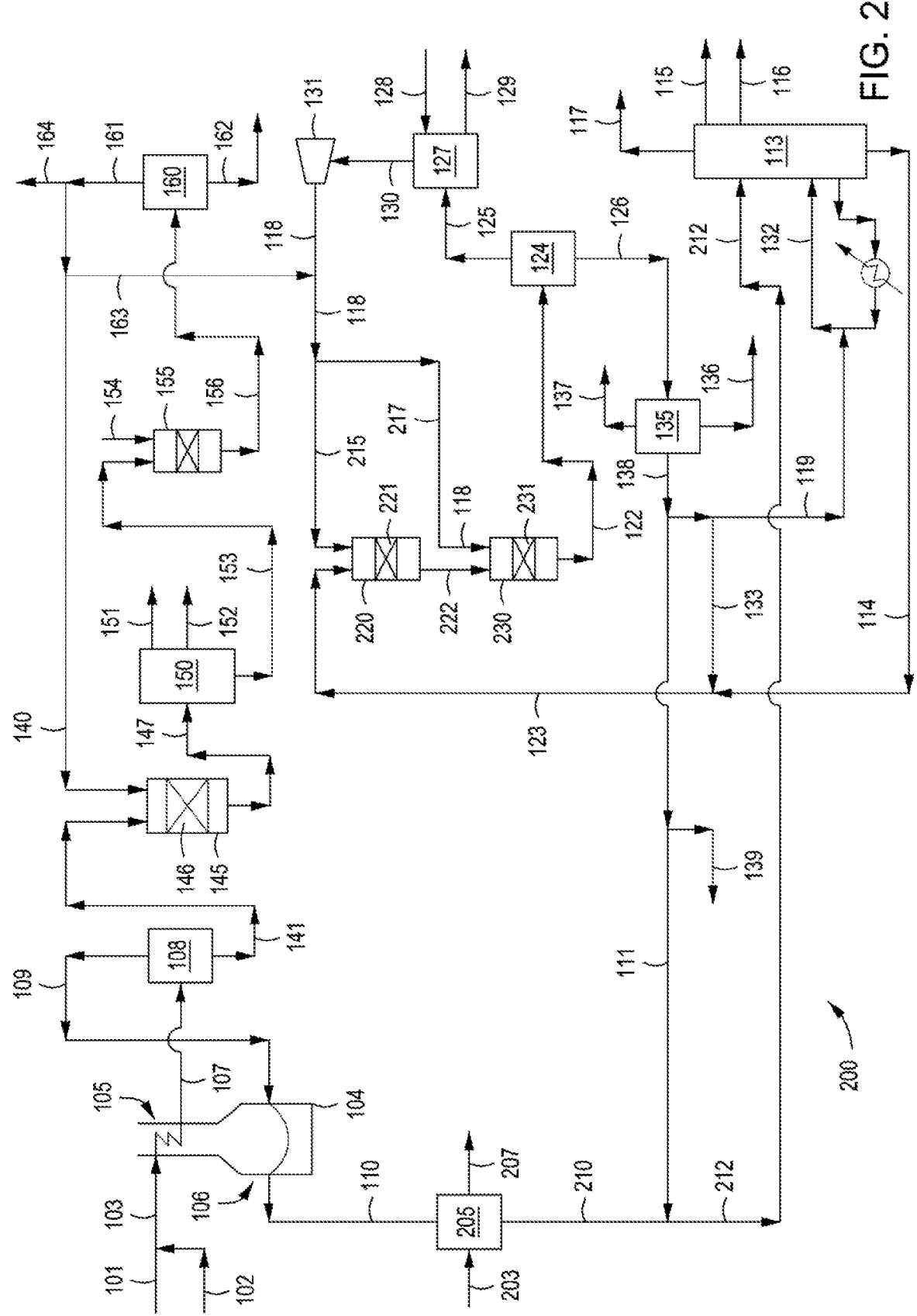
FIG. 2 depicts a schematic of another illustrative system for steam cracking hydrocarbons, cooling a steam cracker effluent, and separating products therefrom, according to one or more embodiments described.

FIG. 2 depicts a schematic of another illustrative system 200 for steam cracking hydrocarbons, cooling a steam cracker effluent, and separating products therefrom, according to one or more embodiments. The system 200 can be similar to the system 100, but can further include one or more heat exchangers 205, one or more stages of pre-treater hydroprocessing 220 for pre-treating the tar-utility fluid mixture of line 123 under pre-treatment hydroprocessing conditions at a location upstream of tar hydroprocessing, and one or more stages of hydroprocessing 230 for hydroprocessing the pre-treated tar in line 114. In some examples, the steam cracker effluent in line 110 and water or steam via line 203 can be introduced to one or more heat exchangers (one is shown, 205) to produce a pre-cooled steam cracker effluent via line 210 and steam, superheated steam, or superheated high pressure steam via line 207. The pre-cooled steam cracker effluent in line 210 can be mixed, blended, combined, or otherwise contacted with the utility fluid or "first portion of the utility fluid" in line 111 to produce a cooled steam cracker effluent in line 212. The pre-cooled steam cracker effluent in line 210 can be at a temperature of $\geq 300°$ C., e.g., about 325° C. to about 500° C., when initially contacted with the first portion of the utility fluid in line 111. The cooled steam cracker effluent via line 212 can be introduced to the one or more separators of the second separation stage 113 and processed as disclosed above with reference to FIG. 1.

In certain aspects, the tar product via line 114 and molecular hydrogen via line 215 can be introduced to pre-treater hydroprocessor 220. In other aspects, the tar-utility fluid mixture of line 123 can be introduced into the pre-treater hydroprocessor 220. The pre-treater hydroprocessing can be carried out in the presence of the molecular hydrogen from line 215 and a first catalyst, e.g., catalyst bed 221, under a set of hydroprocessing conditions (pre-treater hydroprocessing conditions) to produce an intermediate or pre-treated hydroprocessed tar product that can be conducted away via line 222.

The pre-treated hydroprocessed tar product via line 222 and optionally molecular hydrogen via line 217 can be introduced to the tar hydroprocessor 230. In some examples, in addition to or in lieu of introducing molecular hydrogen via line 217, molecular hydrogen can be cascaded from the pre-treater hydroprocessor 220 into the tar hydroprocessor 230 with the pre-treated hydroprocessed tar product via line 222. The pre-treated hydroprocessed tar product can be hydroprocessed in the presence of the molecular hydrogen and a second catalyst, e.g., catalyst bed 231, to produce the first hydroprocessed product that can be conducted away via line 122. It should be understood that any number of hydroprocessing units and any number of hydroprocessing conditions can be used to produce the first hydroprocessed product in line 122.

Pre-treater hydroprocessing conditions can include a temperature $T_{PT} \leq 400°$ C., a space velocity (WHSV$_{PT}$) $\geq 0.2$ hr$^{-1}$, $\geq 0.25$ hr$^{-1}$, or $\geq 0.3$ hr$^{-1}$ based on the weight of the tar product of line 114 or the weight of the tar-utility fluid mixture of line 123 that is subjected to the pre-treater hydroprocessing conditions, a total pressure ("$P_{PT}$") $\geq 3.5$ MPa, e.g., $\geq 6$ MPa, and supplying the molecular hydrogen at a rate <3000 standard cubic feet per barrel of the tar product of line 114 or the tar-utility fluid mixture of line 123 (SCF/B) (534 S m$^3$/m$^3$).

Pre-treater hydroprocessing conditions can be less severe than the hydroprocessing conditions utilized in the tar hydroprocessors 120 and 230. For example, compared to tar hydroprocessing conditions, pre-treater hydroprocessing conditions utilize one or more of a lesser hydroprocessing temperature, a lesser hydroprocessing pressure, a greater feed (tar+utility fluid) WHSV, a greater pyrolysis tar WHSV, and a lesser molecular hydrogen consumption rate. Within the parameter ranges (T, P, WHSV, etc.) specified for pre-treater hydroprocessing conditions, particular hydroprocessing conditions can be selected to achieve a desired 566° C.+ conversion, typically in the range of from 0.5 wt. % to 5 wt. % substantially continuously for at least ten days. Tar hydroprocessor 230 can be operated under tar hydroprocessing conditions selected from among those specified for tar hydroprocessor 120. Stages for one or more of tar thermal treatment (e.g., heat soaking), solids-removal, and guard-bed hydroprocessing can be carried out upstream of the pretreater, as disclosed in U.S. Patent Application No. 62/716,754.

Figure 3:
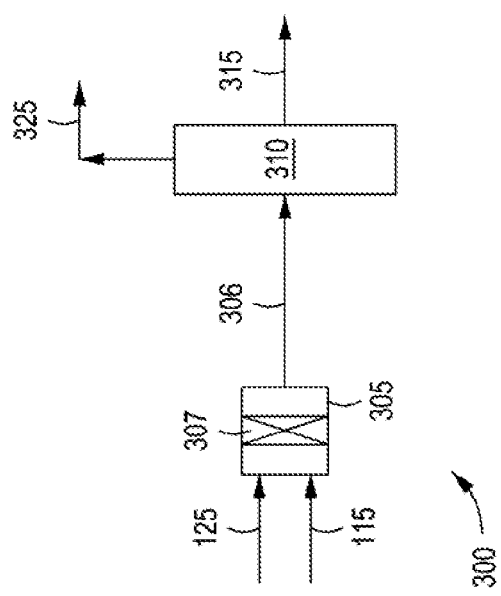
FIG. 3 depicts a schematic of an illustrative system for stabilizing a steam cracker naphtha, according to one or more embodiments described.

FIG. 3 depicts a schematic of an illustrative system 300 for stabilizing the steam cracker naphtha in line 115 shown in FIGS. 1 and 2, according to one or more embodiments. In some examples, the steam cracker naphtha and/or steam cracker gas oil (e.g., a diesel boiling-range oil) via line 115 and the second vapor phase product via line 125 can be introduced into one or more third hydroprocessing units 305. The steam cracker naphtha can be hydroprocessed, e.g., hydrotreated, in the presence of molecular hydrogen contained in the second vapor phase product and a catalyst, e.g., catalyst bed 307, to produce a mixture that can include stabilized steam cracker naphtha and the second vapor phase that can be conducted away via line 306.

It has been found that the second vapor phase product via line 125 can be introduced into the third hydroprocessing unit 305 without the need to compress the second vapor phase product. More particularly, it has been found that the first hydroprocessing unit 121 and/or the one or more first stage hydroprocessing units 220 and the one or more second stage hydroprocessing units 230 can be operated at a greater pressure than the third hydroprocessing unit 310 such that the second vapor phase product in line 125 can be used as a source of molecular hydrogen in the third hydroprocessing unit 305 without requiring compression. It should also be noted that, while not shown, the second vapor phase product in line 115 can also be introduced to the second hydroprocessing unit 145 to provide a source of molecular hydrogen therein and can be introduced thereto without the need for compression.

The hydroprocessed mixture via line 306 can be introduced into one or more separators of a "seventh separation stage" 310. The stabilized steam cracker naphtha via line 315 and the second vapor phase product via line 325 can be recovered from the sixth separation stage 310. The second vapor phase product via line 325 can be introduced into the one or more upgrading units 127.

It has been discovered that the utility fluid product is a hydrogen donor that can bind with fouling precursors in the steam cracker effluent to decrease or prevent foulant formation during transport and/or hydroprocessing of the steam cracker effluent. It has also been discovered that the utility fluid product is a hydrogen donor that can also decrease or prevent fouling in a primary separation stage, e.g., within one or more separators of the second separation stage 113. It was also discovered that the hydrogen donor properties of the utility fluid product make it an improved solvent for use in hydroprocessing the tar product.

As used herein, the terms "utility fluid" and "utility fluid product" are used interchangeably and refer to a hydrocarbon composition that includes, but is not limited to, aromatic ring compounds. In some examples, the utility fluid product can include aromatic ring compounds and non-aromatic ring compounds. In some examples, the utility fluid product can be or include aromatic ring compounds or aromatic ring compounds and non-aromatic ring compounds, in an amount of $\geq 10$ wt. %, $\geq 20$ wt. %, $\geq 30$ wt. %, $\geq 40$ wt. %, $\geq 50$ wt. %, $\geq 60$ wt. %, $\geq 70$ wt. %, $\geq 80$ wt. %, $\geq 90$ wt. %, $\geq 95$ wt. %, or $\geq 98$ wt. %, based on a weight of the utility fluid product. In some examples, the utility fluid product can include $\geq 10$ wt. %, $\geq 20$ wt. %, $\geq 30$ wt. %, $\geq 40$ wt. %, $\geq 50$ wt. %, $\geq 60$ wt. %, $\geq 70$ wt. %, $\geq 80$ wt. %, $\geq 90$ wt. %, $\geq 95$ wt. %, or $\geq 99$ wt. % of aromatic ring compounds, based on the weight of the utility fluid product. The aromatic ring compounds can be or include 1-ring aromatic compounds, 2-ring aromatic compounds, 3-ring aromatic compounds, or any mixture thereof. The amount of aromatic ring compounds can be determined by Nuclear Magnetic Resonance, (e.g., $^{13}$C NMR). Suitable methods for analyzing the aromatic and non-aromatic content of the utility fluid product are disclosed in U.S. Pat. No. 9,777,227 and in U.S. Patent Application Ser. No. 62/716,754.

In certain aspects, the utility fluid product can include from 0.5 to 7.0 ring class compounds, e.g., one or more of 0.5, 1.0, 1.5, 2.0, 2.5, 3.0, 3.5, 4.0, 4.5 ring class compounds. Typically, the utility fluid product comprises $\leq 0.1$ wt. %, e.g., $\leq 0.05$ wt. %, such as $\leq 0.01$ wt. % total of 5.5, 6.0, 6.5, and 7.0 ring class compounds, based on the weight of the utility fluid product. Although other utility fluid products are within the scope of the invention, certain utility fluid products comprise, consist essentially of, or even consists of from 0.5 to 5.0 ring class compounds, e.g., 1.0 to 3.0 ring class compounds, such as 1.5 to 3.0 ring class compounds. In some examples, the utility fluid product can be or include, but is not limited to, (a) ≥1 wt. % of 1.0 ring class compounds; (b) ≥5 wt. % of 1.5 ring class compounds; and (c) ≥5 wt. % of 2.0 ring class compounds, where all weight percent values are based on a weight of the utility fluid product. In other examples, the utility fluid product can be or include, but is not limited to, (a) ≥1 wt. % to about 20 wt. % of 1.0 ring class compounds; (b) ≥25 wt. % to about 95 wt. % of 1.5 ring class compounds; (c) ≥5 wt. % to about 80 wt. % of 2.0 ring class compounds; and (d) ≥0.01 wt. % to about 0.5 wt. % of 5.0 ring class compounds, where all weight percent values are based on a weight of the utility fluid product. In certain aspects the utility fluid product comprises 1 wt. % to 10 wt. % of 1.0 ring class compounds, about 30 wt. % to 60 wt. % of 1.5 ring class compounds, and about 10 wt. % to 40 wt. % of 2.0 ring class compounds. Optionally, the utility fluid comprises ≤1.0 wt. % of 4.0 ring class compounds, e.g., 0.01 wt. % to 1 wt. %; and/or ≤1.0 wt. % of 3.0 ring class compound, e.g., 0.1 wt. % to 1 wt. %. It is generally desirable for the utility fluid product to be substantially free of molecules having terminal unsaturation, for example, vinyl aromatics. The term "substantially free" in this context means that the utility fluid comprises ≤10.0 wt. % (e.g., ≤5.0 wt. % or ≤1.0 wt. %) vinyl aromatics, based on the weight of the utility fluid.

As used herein, the term "0.5 ring class compound" means a molecule having only one non-aromatic ring moiety and no aromatic ring moieties in the molecular structure. As used herein, the term "non-aromatic ring" means four or more carbon atoms joined in at least one ring structure where at least one of the four or more carbon atoms in the ring structure is not an aromatic carbon atom. Aromatic carbon atoms can be identified using $^{13}C$ Nuclear magnetic resonance, for example. Non-aromatic rings having atoms attached to the ring (e.g., one or more heteroatoms, one or more carbon atoms, etc.), but which are not part of the ring structure, are within the scope of the term "non-aromatic ring".

Examples of non-aromatic rings include a pentacyclic ring—five carbon member ring such as cyclopentane and a hexacyclic ring—six carbon member ring such as cyclohexane. It should be understood that the non-aromatic ring can be statured as exemplified above or partially unsaturated for example, cyclopentene, cyclopenatadiene, cyclohexene and cyclohexadiene. Non aromatic rings, which can primarily be six and five member non-aromatic rings, can contain one or more heteroatoms such as sulfur (S), nitrogen (N) and oxygen (O). Illustrative non-aromatic rings with heteroatoms can be or include, but are not limited to, tetrahydrothiophene, pyrrolidine, tetrahydrofuran, tetrahydro-2H-thiopyran, piperidine, and tetrahydro-2H-pyran. It should be understood that the non-aromatic rings with hetero atoms can be saturated or partially unsaturated.

As used herein, the term "1.0 ring class compound" means a molecule containing only one of the following ring moieties but no other ring moieties: (i) one aromatic ring 1·(1.0 ring) in the molecular structure, or (ii) two non-aromatic rings 2·(0.5 ring) in the molecular structure. As used herein, the term "aromatic ring" means five or six atoms joined in a ring structure where: (i) at least four of the atoms joined in the ring structure are carbon atoms, and (ii) all of the carbon atoms joined in the ring structure are aromatic carbon atoms. It should be understood that aromatic rings having atoms attached to the ring, e.g., one or more heteroatoms, one or more carbon atoms, etc., but which are not part of the ring structure are within the scope of the term "aromatic ring". Illustrative aromatic rings can be or include, but are not limited to, (i) a benzene ring such as benzene; (ii) a thiophene ring such as thiophene; (iii) a pyrrole ring such as 1H-pyrrol; and (iv) a furan ring such as furan.

When there is more than one ring in a molecular structure, the rings can be aromatic rings and/or non-aromatic rings. The ring to ring connection can be of two types: type (1) where at least one side of the ring is shared, and type (2) where the rings are connected with at least one bond. The type (1) structure is also known as a fused ring structure. The type (2) structure is also commonly known as a bridged ring structure. Some examples of the type (1) fused ring structure include, but are not limited to, naphthalene; 1,2,3,4-tetrahydronaphthalene; decahydronaphthalene, indane; and octahydropentalene. An example of the type (2) bridged ring structure can be as follows:

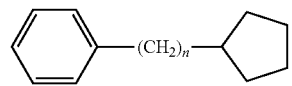

where n is an integer equal to 0, 1, 2, or 3. When there are two or more rings (aromatic rings and/or non-aromatic rings) in a molecular structure, the ring to ring connection may include all type (1) connections, all type (2) connections, or a mixture of types (1) connections and type (2) connections.

As used herein, the term "1.5 ring class compound" means a molecule containing only one of the following ring moieties, but no other ring moieties: (i) one aromatic ring 1·(1.0 ring) and one non-aromatic ring 1·(0.5 ring) in the molecular structure or (ii) three non-aromatic rings 3·(0.5 ring) in the molecular structure. As used herein, the term "2.0 ring class compound" means a molecule containing only one of the following ring moieties, but no other ring moieties: (i) two aromatic rings 2·(1.0 ring), (ii) one aromatic ring 1·(1.0 ring) and two non-aromatic rings 2·(0.5 ring) in the molecular structure, or (iii) four non-aromatic rings 4·(0.5 ring) in the molecular structure. As used herein, the term "2.5 ring class compound" means a molecule containing only one of the following ring moieties, but no other ring moieties: (i) two aromatic rings 2·(1.0 ring) and one non-aromatic rings 1·(0.5 ring) in the molecular structure, (ii) one aromatic ring 1·(1.0 ring) and three non-aromatic rings 3·(0.5 ring) in the molecular structure, or (iii) five non-aromatic rings 5·(0.5 ring) in the molecular structure. Likewise compounds of the 3.0, 3.5, 4.0, 4.5, 5.0, etc. molecular classes contain a combination of non-aromatic rings counted as 0.5 ring and aromatic rings counted as 1.0 ring, such that the total is 3.0, 3.5, 4.0, 4.5, 5.0, 5.5, 6.0, 6.5, 7.0, etc. respectively. For example, 5.0 ring class compounds contain only one of the following ring moieties, but no other ring moieties: (i) five aromatic rings 5·(1.0 ring) in the molecular structure, (ii) four aromatic rings 4·(1.0 ring) and two non-aromatic rings 2·(0.5 ring) in the molecular structure, (iii) three aromatic rings 3·(1.0 ring) and four non-aromatic rings 4·(0.5 ring) in the molecular structure, (iv) two aromatic rings 2·(1.0 ring) and six non-aromatic rings 6·(0.5 ring) in the molecular structure, (v) one aromatic ring 1·(1.0 ring) and eight non-aromatic rings 8·(0.5 ring) in the molecular structure, or (vi) ten non-aromatic rings 10·(0.5 ring) in the molecular structure. It should be understood that all of the multi-ring classes can include ring compounds having hydrogen, alkyl, or alkenyl groups bound thereto, e.g., one or more of H, $CH_2$, $C_2H_4$ through $C_nH_{2n}$, $CH_3$, $C_2H_5$ through $C_nH_{2n+1}$. Generally, n is from 1 to 6, e.g., from 1 to 5.

The utility fluid product can include 0.5, 1.0, 1.5, 2.0, 2.5, 3.0, 3.5, 4.0, and/or 4.5 ring class compounds. The utility fluid product can further include 0.1 wt. % or less, 0.05 wt. % or less, or 0.01 wt. % or less of 5.0 ring class compounds, based on the weight of the utility fluid product. In some examples, the utility fluid product can include 0.1 wt. % or less, 0.05 wt. % or less, or 0.01 wt. % or less of a total amount of 5.5, 6.0, 6.5, and 7.0 ring class compounds, based on the weight of the utility fluid product. In some examples, the utility fluid product can include 0.5 to 7.0 ring class compounds. In other examples, the utility fluid product can include 0.5 to 5.0 ring class compounds. In other examples, the utility fluid product can include 1.0 to 3.0 ring class compounds.

In some examples, the utility fluid product can be or include about 1 wt. % to about 20 wt. % of 1.0 ring class compounds, about 5 wt. % to about 60 wt. % of 1.5 ring class compounds, and about 5 wt. % to about 60 wt. % of 2.0 ring class compounds, where all weight percent values are based on the weight of the utility fluid product. In other examples, the utility fluid product can include about 5 wt. % to about 22 wt. % of 1.0 ring class compounds, about 15 wt. % to about 80 wt. % of 1.5 ring class compounds, and about 10 wt. % to about 80 wt. % of 2.0 ring class compounds, where all weight percent values are based on the weight of the utility fluid product. In other examples, the utility fluid product can include about 5 wt. % to about 20 wt. % of 1.0 ring class compounds, about 35 wt. % to about 60 wt. % of 1.5 ring class compounds, and about 20 wt. % to about 80 wt. % of 2.0 ring class compounds. In other examples, the utility fluid product can include one or more of (i) 20 wt. % or less of 1.0 ring class compounds, (ii) 1 wt. % or less of 4.0 ring class compounds, and (iii) 1 wt. % or less of 3.0 ring class compounds, where all weight percent values are based on the weight of the utility fluid product.

The utility fluid product can have a 10% distillation point of ≥60° C. and a 90% distillation point of 350° C. or less, as measured according to ASTM D86-17. In some examples, the utility fluid product can have a 10% distillation point of ≥120° C., e.g., ≥140° C. or ≥150° C., and/or a 90% distillation point of 300° C. or less, as measured according to ASTM D86-17. The utility fluid product can have a critical temperature of about 285° C. to about 400° C. and include aromatics, including alkyl-functionalized derivatives thereof. The utility fluid product can have a high solvency, as measured by solubility blending number ("$S_{BN}$"). In some examples, the utility fluid product can have an $S_{BN}$ of about 90, about 100, or about 110 to about 120, about 130, or about 140. The $S_{BN}$ is a parameter that relates to the compatibility of an oil with different proportions of a model solvent mixture, such as toluene/n-heptane. The $S_{BN}$ is related to the insolubility number ("$I_N$"), which can be determined in a similar manner, as disclosed in U.S. Pat. No. 5,871,634.

In some examples, the utility fluid product can include ≥90 wt. % of a single-ring aromatic, including those having one or more hydrocarbon substituents, such as from 1 to 3 or 1 to 2 hydrocarbon substituents. Illustrative hydrocarbon substituents or hydrocarbon groups can be or include, but are not limited to, $C_1$-$C_6$ alkyls, where the hydrocarbon groups can be branched or linear and the hydrocarbon groups can be the same or different. In some examples, the utility fluid product can include ≥90 wt. % of one or more of benzene, ethylbenzene, trimethylbenzene, xylenes, toluene, naphthalenes, alkylnaphthalenes (e.g., methylnaphtalenes), tetralins, or alkyltetralins (e.g., methyltetralins), based on the weight of the utility fluid product.

In some examples, the utility fluid product can be substantially free of molecules having terminal unsaturates, for example, vinyl aromatics. As used herein, the term "substantially free" means that the utility fluid product includes 10 wt. % or less, e.g., 5 wt. % or less or 1 wt. % or less, of terminal unsaturates, based on the weight of the utility fluid product. The utility fluid product can include ≥50 wt. % of molecules having at least one aromatic core, e.g., ≥60 wt. % or ≥70 wt. %, based on the weight of the utility fluid product. In some examples, the utility fluid product can include ≥60 wt. % of molecules having at least one aromatic core and 1 wt. % or less of terminal unsaturates, e.g., vinyl aromatics, based on the weight of the utility fluid product.

In some examples, the utility fluid product can include aromatic ring compounds and have a 10% distillation point of ≥60° C. and a 90% distillation point of 425° C. or less, as measured according to ASTM D86-17. In some examples, the utility fluid product can include ≥25 wt. % of aromatic ring compounds, based on the weight of the utility fluid product and can have a $S_{BN}$ of ≥100, or ≥120, ≥130, or ≥140, such as about 110 to about 155, or about 120 to about 150. In these and other examples, the utility fluid product can have a true boiling point distribution having an initial boiling point of ≥177° C. and a final boiling point of 566° C. or less, e.g., 430° C. or less. True boiling point distributions (the distribution at atmospheric pressure) can be measured according to ASTM D7500-15. In some examples, the utility fluid product can include aromatic ring compounds, have a 10% distillation point of ≥60° C. and a 90% distillation point of 350° C. or less, as measured according to ASTM D86-17, have a critical temperature of about 285° C. to about 400° C., and include ≥80 wt. % of 1-ring aromatics and/or 2-ring aromatics, including alkyl-functionalized derivatives thereof, based on a weight of the utility fluid product. In other examples, the utility fluid product can include aromatic ring compounds, have a 10% distillation point of ≥60° C. and a 90% distillation point of 350° C. or less, as measured according to ASTM D86-17, have a critical temperature of about 285° C. to about 400° C., and include ≥80 wt. % of 1-ring aromatics, 2-ring aromatics, and 3-ring aromatics including alkyl-functionalized derivatives thereof, based on a weight of the utility fluid product.

As noted above, the utility fluid product can be produced by hydroprocessing the tar product separated from the cooled steam cracker effluent. In some examples, the utility fluid product can be the same or similar to the utility fluids disclosed in U.S. Pat. Nos. 9,090,836; 9,637,694; and 9,777,227; and International Patent Application Publication No. WO 2018/111574. It should be understood that the utility fluid product can be produced via any suitable process. In some examples, one or more aromatic ring compounds or one or more aromatic ring compounds and one or more non-aromatic ring compounds can be mixed, blended, combined, or otherwise contacted to produce the utility fluid product having the composition disclosed herein.

The composition of the utility fluid product can be determined using any suitable test method or combination of test methods. In some examples, conventional methods can be used to determine the types and amounts of compounds in the multi-ring classes disclosed above in the utility fluid product (and other compositions), though any method can be used. For example, it has been found that two-dimensional gas chromatography ("2D GC") is a convenient methodology for performing a quantitative analysis of samples of tar, hydroprocessed product, and other streams and mixtures. These methods for identifying the types and amounts of compounds are not meant to foreclose other methods for identifying molecular types and amounts, e.g., other gas chromatography/mass spectrometry (GC/MS) techniques. Methods for determining the composition of the utility fluid product can include those disclosed in U.S. Pat. No. 9,777, 227.

As noted above, it has been discovered that the utility fluid product is a hydrogen donor that can that can bind with fouling precursors in the steam cracker effluent to decrease or prevent foulant formation. It has also been discovered that the utility fluid product is a hydrogen donor that can also decrease or prevent fouling in a primary separation stage, e.g., within one or more separator(s) of the second separation stage 112. It was also discovered that the hydrogen donor properties of the utility fluid product make it an improved solvent for use in hydroprocessing the tar product.

In some examples, the utility fluid product can be contacted with the steam cracker effluent and/or the cooled steam cracker effluent prior to and/or during separation of products therefrom, when the steam cracker effluent and/or the cooled steam cracker effluent is at a temperature of ≥300° C., ≥325° C., ≥350° C., ≥375° C., or ≥400° C. to about 425° C., about 450° C., about 475° C., or about 500° C. Without wishing to be bound by theory, it is believed that the elevated temperature of the steam cracker effluent and/or the cooled steam cracker effluent contains significant reactive molecules. The utility fluid contains hydrogen radicals that promotes or otherwise improves the rate of hydrogen donation from the utility fluid to the steam cracker effluent stream, e.g., the donation of a hydrogen atom or ion, from the utility fluid product to foulant forming constituents in the steam cracker effluent or the cooled steam cracker effluent, which can decrease or even prevent fouling. Advantageously, the utility fluid produced by the tar hydroprocessing can be used as a quench oil composition at various points upstream of the tar hydroprocessor to lessen and/or eliminate reactor fouling. Without being bound by theory, it is believed that the reduction in (or elimination of) reactor fouling is due to the hydrogen donating ability of the utility fluid composition. Hydrogen radicals transfer from the utility fluid to reactive radicals in various effluent streams, thereby mitigating olefin polymerization and minimizing or eliminating primary fractionator fouling. Since they also contain hydrogen-donor compounds, the second liquid phase product and the hydroprocessor heavy product are also useful as quench oil instead of or in addition to utility fluid.

Advantageously, the various utility fluid product streams can be used to mitigate fouling in downstream processing equipment in a stream cracker, such as the primary fractionator. Moreover, the yield of the product is better. Uncontrolled reactions involving reactive radicals, in conventional processes, lead to polymerization and/or coking, which lead to heavier products such as tar, coke, and fuel gas.

The one or more hydrocarbons that can be mixed, blended, combined, or otherwise contacted with water, steam, or a mixture thereof and heated to produce the heated mixture can include any one or more of a number of hydrocarbons. In some examples, the hydrocarbon can include $C_{5+}$ hydrocarbons. Feeds or hydrocarbon feeds that include $C_{5+}$ hydrocarbons that can be mixed, blended, combined, or otherwise contacted with the water and/or steam and heated to produce the heated mixture can be or include, but is not limited to, raw crude oil, steam cracked gas oils and residues, gas oils, heating oil, jet fuel, diesel, kerosene, gasoline, coker naphtha, steam cracked naphtha, catalytically cracked naphtha, hydrocrackate, reformate, raffinate reformate, Fischer-Tropsch liquids, Fischer-Tropsch gases, natural gasoline, distillate, virgin naphtha, atmospheric pipestill bottoms, vacuum pipestill streams such as vacuum pipestill bottoms and wide boiling range vacuum pipestill naphtha to gas oil condensates, heavy non-virgin hydrocarbons from refineries, vacuum gas oils, heavy gas oil, naphtha contaminated with crude, atmospheric residue, heavy residue, C4's/residue admixture, naphtha/residue admixture, hydrocarbon gases/residue admixture, hydrogen/residue admixtures, waxy residues, gas oil/residue admixture, or any mixture thereof. In other examples, the hydrocarbon can be or include, naphtha, gas oil, vacuum gas oil, waxy residues, atmospheric residues, residue admixtures, crude oil, or any mixture thereof. In some examples, if the hydrocarbon feed (or preheated hydrocarbon feed) comprises, consists essentially of, or even consists of a primarily liquid phase hydrocarbon feed, e.g., a medium or heavy hydrocarbon. "Primarily liquid phase" in this context means a composition of which ≥50 wt. % is in the liquid phase, e.g., ≥75 wt. %, such as ≥90 wt. %. A hydrocarbon feed is a primarily liquid-phase hydrocarbon feed when ≥50 wt. % of the hydrocarbon feed is in the liquid phase at a temperature of 25° C. and a pressure of 1 bar absolute, e.g., ≥75 wt. %, such as ≥90 wt. %. "Heavy hydrocarbon" means a mixture comprising hydrocarbon, the mixture having an API gravity in the range of from 5° up to (but not including) 22°. "Medium hydrocarbon" means a mixture comprising hydrocarbon, the mixture having an API gravity in the range of from 22° to 30°. A "relatively-heavy" hydrocarbon has an API gravity that is less than that of naphtha. The hydrocarbon feed can be a raw feed such as crude oil. "Raw" feed, e.g., raw hydrocarbon feed, means a primarily liquid-phase feed that comprises ≥25 wt. % of crude oil that has not been subjected to prior desalting and/or prior fractionation with reflux, e.g., ≥50 wt. %, such as ≥75 wt. %, or ≥90 wt. %. "Crude oil" means a mixture comprising naturally-occurring hydrocarbon of geological origin, where the mixture (i) comprises ≥1 wt. % of reside, e.g., ≥5 wt. %, such as ≥10 wt. %, and (ii) has an API gravity ≤52°, e.g., ≤30°, such as ≤20°, or ≤10°, or ≤8°. The crude oil can be classified by API gravity, e.g., heavy crude oil has an API gravity in the range of from 5° up to (but not including) 22°. Surprisingly, it has been found that for a wide range of raw heavy crude oil feeds, that operating the steam cracking furnace with an integrated a vapor-liquid separator having a cut point in the narrow range of 510° C. to 566° C., or 523° C. to 542° C., that utilizing the specified utility fluid as the quench fluid results in a number of improvements over prior art hydrocarbon conversion processes. Among these improvements are one or more of (i) an increase in process gas yield, (ii) a decrease in the amount of hydroprocessed heavy product, and (iii) an improvement in certain properties of the hydroprocessed heavy tar product including a viscosity decrease, improved blending characteristics, and a decrease in vinyl aromatic content. In these and certain other aspects the quench fluid is substantially free of primary fractionator bottoms.

Although it is not required, the crude oil can be desalted prior to contacting with the water and/or steam to form the mixture. When the hydrocarbon feed includes a crude oil fraction, the fraction can be produced by separating atmospheric pipestill ("APS") bottoms from the crude oil followed by vacuum pipestill ("VPS") treatment of the APS bottoms. In some examples, the hydrocarbon feed can be or include a crude oil such as a high-sulfur virgin crude oil rich in polycyclic aromatics or a fraction thereof. In other examples, the hydrocarbon feed can be or include a hydroprocessed hydrocarbon, e.g., a crude or reside-containing fraction thereof. In other examples, the hydrocarbon feed can be or include a vapor phase separate from a vacuum reside subjected to a thermal conversion process in a thermal conversion reactor, e.g., a delayed coker, a fluid coker, a flex-coker, a visbreaker, and/or a catalytic hydrovisbreaker). In some examples, the hydrocarbon feed can be or include the hydrocarbons or hydrocarbon feedstocks disclosed in U.S. Pat. Nos. 7,993,435; 8,696,888; 9,327,260; 9,637,694; 9,657,239; and 9,777,227; and International Patent Application Publication No. WO 2018/111574.

The heated mixture that includes the $C_{5+}$ hydrocarbons and the water and/or steam can include about 10 wt. %, about 20 wt. %, or about 30 w % to about 70 wt. %, about 80 wt. %, about 90 wt. %, or about 95 wt. % of the water and/or steam, based on a combined weight of the hydrocarbon and the water and/or steam. The heated mixture that includes the $C_{5+}$ hydrocarbons and the water and/or steam can be heated to a temperature of about 425° C., about 450°, about 475° C., about 500° C., about 515° C., or about 530° C. to about 540° C., about 555° C., about 565° C., or about 585° C. The vapor phase product and the first liquid phase product can be separated from the heated mixture, e.g., via one or more flash drums or other separator(s). In some examples, the first liquid phase product can include hydrocarbons having a minimum boiling point of about 500° C. to about 570° C., about 520° C. to about 550° C., or about 530° C. to about 545° C., as measured according to ASTM D6352-15 or ASTM D2887-16a. Those skilled in the art will appreciate that should an indicated boiling point fall outside the range specified in one or more of these standards, it can be determined by extrapolation. In some examples, the heated mixture can be produced and the vapor phase product and the liquid phase produce can be separated therefrom according to the processes and systems disclosed in U.S. Pat. No. 7,993,435. Some illustrative vapor/liquid separation devices and separation stages that can be used to separate the vapor phase product and the liquid phase produce from the heated mixture can also include those disclosed in U.S. Pat. Nos. 7,138,047; 7,090,765; 7,097,758; 7,820,035; 7,311,746; 7,220,887; 7,244,871; 7,247,765; 7,351,872; 7,297,833; 7,488,459; 7,312,371; 6,632,351; 7,578,929; and 7,235,705.

The vapor phase product can be subjected to steam cracking conditions sufficient to produce the steam cracker effluent. Illustrative steam cracking conditions can include, but are not limited to, one or more of: exposing the vapor phase product to a temperature (as measured at a radiant outlet of a steam cracking apparatus) of ≥400° C., e.g., a temperature of about 700° C., about 800° C., or about 900° C. to about 950 C, a pressure of about 0.1 bar to about 5 bars (absolute), and/or a steam cracking residence time of about 0.01 seconds to about 5 seconds. In some examples, the vapor phase can be introduced to a radiant section of a steam cracking furnace to produce the steam cracker effluent. In some examples, the vapor phase product can be steam cracked according to the processes disclosed in U.S. Pat. Nos. 6,419,885; 7,993,435; 9,637,694; and 9, 777,227; and International Patent Application Publication No. WO 2018/111574.

As discussed above, the steam cracker effluent can be directly contacted with the quench fluid that can be or can include the utility fluid product to produce the cooled steam cracker effluent. In some examples, the steam cracker effluent can also be cooled by indirect heat exchange with a quench medium, e.g., liquid water or steam, before, during, and/or after the steam cracker effluent is directly contacted with the quench fluid. For example, the steam cracker effluent can be cooled by indirect heat exchange, e.g., via one or more transfer line exchangers, with steam to produce superheated steam and a pre-cooled steam cracker effluent. The quench fluid that can be or can include the utility fluid product can be directly contacted with the pre-cooled steam cracker effluent to produce the cooled steam cracker effluent.

In some examples, a plurality of products and co-products can be separated from the upgraded steam cracker effluent, e.g., one or more of a tail gas, ethane, propane, ethylene, propylene, benzene, crude $C_4$ hydrocarbons, steam cracker naphtha, and steam cracker gas oil. In some examples, a motor gasoline ("mogas") blendstock can be produced. Mogas blendstock is a mixture that includes $C_4$-$C_{12}$ hydrocarbons having an initial normal boiling point of about 35° C. and a final boiling point of about 200° C. The mogas blendstock can include the stabilized steam cracker naphtha. The tail gas can include, but is not limited to, molecular hydrogen, methane, or a mixture thereof. In some examples, at least two, at least three, at least four, at least five, at least six, at least seven, or all of molecular hydrogen, ethane, ethylene, propane, propylene, crude $C_4$ hydrocarbons, steam cracker naphtha, and steam cracker gas oil can be separated from the upgraded steam cracker effluent.

In some examples, conventional separation equipment can be used to separate the tar product and other products, e.g., the upgraded steam cracker effluent, from the cooled steam cracker effluent, e.g., one or more flash drums, knock out drums, etc. One or more fractionators, water-quench towers, indirect condensers, etc., can be used for separating from the upgraded steam cracker effluent one or more of process gas, SCN, SCGO, and bottoms. Typically at least one primary fractionator is used, e.g., a combined primary fractionator—quench tower. In some examples, illustrative separation stages can include those disclosed in U.S. Pat. No. 8,083,931, for example. In other examples, the products that can be separated from the cooled steam cracker effluent, e.g., the tar product and at least one of ethylene and propylene, can be separated according to the processes and systems disclosed in U.S. Patent Application Publication No. 2014/0357923.

The tar product can be or include, but is not limited to, a mixture of hydrocarbons having one or more aromatic components and, optionally, non-aromatic and/or non-hydrocarbon molecules, the mixture being derived from hydrocarbon pyrolysis, with ≥70% to about 100% of the mixture having a boiling point at atmospheric pressure that is ≥290° C., e.g., 290° C. to about 500° C. In some examples, the tar product can have an initial boiling point of ≥200° C. In other examples, ≥90 wt. % to about 100 wt. % of the tar product can have a boiling point at atmospheric pressure of ≥290° C., e.g., 290° C. to about 500° C. In other examples, the tar product can include ≥50 wt. %, ≥75 wt. %, or ≥90 wt. % to about 97 wt. %, about 99 wt. %, or about 100 wt. % of hydrocarbon molecules (including mixtures and aggregates thereof), based on the weight of the tar product, and (i) one or more aromatic components and (ii) a number of carbon atoms of ≥15, e.g., 15 to about 100. In some examples, the tar product can have a metals content of about 1 ppmw to about 2,000 ppmw, e.g., about 5 ppmw to less than 1,000 ppmw, based on the weight of the tar product. In some examples, the tar product can be what is also sometimes referred to as pyrolysis tar obtained from steam cracking.

The tar product can also include tar heavies. "Tar heavies" are a product of hydrocarbon pyrolysis having an atmospheric boiling point of ≥565° C. and can include ≥5 wt. %, e.g., 5 wt. % to about 20 wt. %, about 50 wt. %, about 75 wt. %, or about 100 wt. %, of molecules having a plurality of aromatic cores based on the weight of the product. The tar heavies are typically solid at 25° C. and generally include the fraction of the tar product that is not soluble in a 5:1 (vol:vol) ratio of n-pentane:tar product at 25° C. Tar heavies can also include asphaltenes and other high molecular weight molecules.

In some examples, the tar product can include about 5 wt. % to about 40 wt. % of tar heavies, based on the weight of the tar product, can have an ° API gravity measured at a temperature of 15.8° C. of 8.5 or less, e.g., about 1 to about 8.5, as measured according to ASTM D287-12b, and can have a 50° C. viscosity of about 200 cSt to about 10,000,000 cSt, as measured according to ASTM D445-17a. In some examples, the tar product can also have a sulfur content of about 0.5 wt. %, about 1 wt. %, about 1.5 wt. %, or about 2 wt. % to about 4 wt. %, about 5 wt. %, about 6 wt. %, or about 7 wt. %, based on the weight of the tar product. In other examples, the tar product can include less than 0.5 wt. %, less than 0.3 wt. %, less than 0.1 wt. %, or less than 0.05 wt. % of sulfur, based on the weight of the tar product.

In some examples, the tar product can include about 5 wt. % to 40 wt. % of tar heavies, based on the weight of the tar product, can have a density at 15° C. of about 1.01 g/cm3 to about 1.19 g/cm3, and can have a 50° C. viscosity of ≥200 cSt to about 10,000,000 cSt. In some examples, the tar product can have a 50° C. kinematic viscosity of ≥10,000 cSt, or ≥100,000 cSt, to about 1,000,000 cSt, or about 10,000,000 cSt or more. Optionally, the tar product can have an $I_N$ greater than 80 and greater than 70 wt. % of the tar product's molecules can have an atmospheric boiling point of ≥290° C. Typically, the tar product can have an insoluble content of ≥0.5 wt. %, ≥1 wt. %, ≥2 wt. %, ≥4 wt. %, or ≥5 wt. % to about 6 wt. %, about 8 wt. %, or about 10 wt. % or more. The insolubles content refers to the amount (in wt. %) of components of a hydrocarbon-containing composition that are insoluble in a mixture of 25% by volume heptane and 75% by volume toluene. Determination of the insolubles content is well-known and can determined according to the procedure disclosed in International Patent Application Publication No. WO 2018/111574.

The tar product separated from the cooled steam cracker effluent can be hydroprocessed to produce the hydroprocessed product or first hydroprocessed product. The hydroprocessing can be carried out in one or more hydroprocessing stages under hydroconversion conditions that can be independently selected for each stage, e.g., under conditions for carrying out one or more of pre-treatment, hydrocracking (including selective hydrocracking), hydrogenation, hydrotreating, hydrodesulfurization, hydrodenitrogenation, hydrodemetallation, hydrodearomatization, hydroisomerization, or hydrodewaxing of the tar product as the case may be. In some examples, the tar product can be hydroprocessed in one or more hydroprocessing units that can include one or more hydroprocessing vessels or zones. The hydroprocessing vessel or zone can include one or more catalysts disposed therein. The catalyst can be in the form of a fixed catalyst bed, a circulating or slurry bed, or any other configuration. In some examples, the tar product, prior to being subjected to hydroprocessing can be subjected to a deasphalting process to produce a deasphalted tar product and the deasphalted tar product can be hydroprocessed.

In certain aspects, the tar product can contact the catalyst in the vessel or zone in the presence of molecular hydrogen. The hydroprocessing conditions can include contacting the tar product heated to a temperature of about 50° C., about 150° C., about 200° C. or about 220° C. to about 400° C., about 410° C., about 420° C., about 430° C., about 450° C., or about 500° C. with the catalyst in the presence of molecular hydrogen. Liquid hourly space velocity (LHSV) of the tar product can be about 0.1 h$^{-1}$, about 0.3 h$^{-1}$, about 0.5 h$^{-1}$, or about 1 h$^{-1}$ to about 5 h$^{-1}$, about 10 h$^{-1}$, about 20 h$^{-1}$, about 25 h$^{-1}$, or about 30 h$^{-1}$. The molecular hydrogen partial pressure during the hydroprocessing can be about 0.1 MPa, about 1 MPa, about 2 MPa, or about 3 mPa to about 5 MPa, about 6 MPa, about 7 MPa, or about 8 MPa. In some examples, the hydroprocessing conditions can include, e.g., one or more of a temperature of about 200° C. to about 500° C., a pressure of about 15 bar (absolute), about 20 bar, or about 30 bar to about 100 bar, about 120 bar, or about 135 bar, a space velocity (LHSV) of about 0.1 h$^{-1}$ to about 5 h$^{-1}$, and a molecular hydrogen consumption rate of about 50 standard cubic meters/cubic meter of the tar product to about 700 standard cubic meters/cubic meter of the tar product.

When a temperature is indicated for a set of hydroprocessing conditions in a hydroprocessing vessel or zone that includes a catalyst bed, the temperature refers to the average temperature of the catalyst bed in the hydroprocessing zone (one half the difference between the inlet and outlet temperatures of the catalyst bed). When the hydroprocessing reactor contains more than one hydroprocessing zone that each include a catalyst bed, the hydroprocessing temperature is the average temperature in the hydroprocessing reactor (one half the difference between the inlet temperature of the most upstream catalyst bed and the outlet temperature of the most downstream catalyst bed).

In some examples, the tar product can be hydroprocessed in the presence of molecular hydrogen in one or more pre-treater hydroprocessing stages under a first set of hydroprocessing conditions (pre-treater hydroprocessing conditions) to produce a pre-treated tar product that includes a vapor portion and a liquid portion and the pre-treated tar product can be hydroprocessed in one or more tar hydroprocessor stages under a second set of hydroprocessing conditions (tar hydroprocessing conditions) to produce the first hydroprocessed product. The pre-treater hydroprocessing conditions and the tar hydroprocessing conditions typically have at least one process parameter that is different. For example, the pre-treater hydroprocessing conditions can be carried out at a temperature that is less than a temperature used in the tar hydroprocessing conditions. The pre-treater hydroprocessing conditions are typically carried out in at least one hydroprocessing zone located in at least one pre-treater hydroprocessing stage of a pre-treater hydroprocessor reactor. In some examples, the pre-treater hydroprocessing reactor can be in the form of a conventional hydroprocessing reactor.

The pre-treater hydroprocessing conditions can include one or more of (a) a temperature ($T_{PT}$) of less than or equal to 400° C., e.g., about 100° C. to 400° C., (b) a weight hour space velocity (WHSV$_{PT}$) of ≥0.2 hr$^{-1}$, ≥0.25 hr$^{-1}$, or ≥0.3 hr$^{-1}$ to about 30 hr$^{-1}$ based on the weight of the tar product of line 114 or the weight of the tar-utility fluid mixture of line 123 that is subjected to the pre-treater hydroprocessing conditions, (c) a total pressure ($P_{PT}$) of ≥6 MPa or ≥8 MPa to about 15.2 MPa, and (d) in the presence of molecular hydrogen supplied at a rate ($SR_{PT}$) of less than 534, e.g., about 50 to about 400, standard cubic meters per cubic meter of the tar product of line 114 or the tar-utility fluid mixture of line 123. In some examples, the pre-treater hydroprocessing conditions can include one or more of (a) a $T_{PT}$ of about 220° C. to about 300° C., (b) a $WHSV_{PT}$ of about 1.5 hr$^{-1}$ or about 2 hr$^{-1}$ to about 2.5 hr$^{-1}$ or about 3 hr$^{-1}$, (c) a $P_{PT}$ of ≥8 MPa to about 10 MPa, about 12 MPa, or about 13.1 MPa, and (d) in the presence of molecular hydrogen supplied at a rate ($SR_{PT}$) of about 53, about 100, about 150, or about 175 standard cubic meters per cubic meter of the tar product of line 114 or the tar-utility fluid mixture of line 123 to about 178, about 200, about 250, about 300, about 400, about 500, or about 530 standard cubic meters per cubic meter of the tar product of line 114 or the tar-utility fluid mixture of line 123. In the pre-treater hydroprocessing conditions, the molecular hydrogen can be consumed at a rate of about 10, about 15, about 18, about 20, about 25, about 30, or about 40 standard cubic meters per cubic meter of the tar product of line 114 or of the tar product in the tar-utility fluid mixture of line 123 to about 80, about 85, about 90, about 95, about 100, about 105, about 107, about 110, or about 120 standard cubic meters per cubic meter of the tar product of line 114 or of the tar product in the tar-utility fluid mixture of line 123.

In particular aspects, the pre-treater hydroprocessing conditions can include one or more of $T_{PT} \geq 150°$ C., e.g., ≥200° C. but less than $T_T$ (e.g., $T_{PT} \leq T_T - 10°$ C., such as $T_{PT} \leq T_T - 25°$ C., such as $T_{PT} \leq T_T - 50°$ C.), a total pressure $P_{PT}$ that is ≥8 MPa but less than $P_T$, $WHSV_{PT} \geq 0.2$ hr$^{-1}$, ≥0.25 hr$^{-1}$, or ≥0.3 hr$^{-1}$ and greater than $WHSV_T$ (e.g., $WHSV_{PT} \geq WHSV_T + 0.01$ hr$^{-1}$, such as $\geq WHSV_T + 0.05$ hr$^{-1}$, or $\geq WHSV_T + 0.1$ hr$^{-1}$, or $\geq WHSV_T + 0.5$ hr$^{-1}$, or $\geq WHSV_T + 1$ hr$^{-1}$, or $\geq WHSV_T + 10$ hr$^{-1}$, or more), and a molecular hydrogen consumption rate in the range of from 150 standard cubic meters of molecular hydrogen per cubic meter of the tar product of line 114 or of the tar product in the tar-utility fluid mixture of line 123 (S m$^3$/m$^3$) to about 400 standard cubic meters of molecular hydrogen per cubic meter of the tar product of line 114 or of the tar product in the tar-utility fluid mixture of line 123 (S m$^3$/m$^3$) (845 SCF/B to 2250 SCF/B) but less than that of tar hydroprocessing. The pretreatment hydroprocessing conditions typically include $T_{PT}$ in the range of from 260° C. to 300° C.; $WHSV_{PT}$ in the range of from 1.5 hr$^{-1}$ to 3.5 hr$^{-1}$, e.g., 2 hr$^{-1}$ to 3 hr$^{-1}$; a $P_{PT}$ in the range of from 6 MPa to 13.1 MPa; and a molecular hydrogen consumption rate in the range of from 100 standard cubic feet per barrel of the tar product of line 114 or of the tar product in the tar-utility fluid mixture of line 123 (SCF/B) (18 S m$^3$/m$^3$) to 600 standard cubic feet per barrel of the tar product of line 114 or of the tar product in the tar-utility fluid mixture of line 123 (SCF/B) (107 S m$^3$/m$^3$). Although the amount of molecular hydrogen supplied to a hydroprocessing stage operating under pretreatment hydroprocessing conditions is generally selected to achieve the desired molecular hydrogen partial pressure, it is typically in a range of about 300 standard cubic feet per barrel of the tar product or the tar-utility fluid mixture (SCF/B) (53 S m$^3$/m$^3$) to about 1000 standard cubic feet per barrel of the tar product or the tar-utility fluid mixture (SCF/B) (178 S m$^3$/m$^3$). Optionally, one or more stages for solids-removal and/or guard-bed hydroprocessing are carried out upstream of the pretreater, as disclosed in U.S. Patent Application No. 62/716,754.

The molecular hydrogen can be combined with the tar product or the tar-utility fluid mixture upstream of the hydroprocessing unit and/or introduced directly to the hydroprocessing unit. The molecular hydrogen can be relatively pure hydrogen or can be in the form of a "treat gas" or "tail gas" that contains sufficient molecular hydrogen for use in the pre-treater hydroprocessing conditions and optionally includes other gases (e.g., nitrogen and light hydrocarbons such as methane) that generally do not adversely interfere with or affect either the reactions or the products. In some examples, the treat gas can include ≥50 vol % of molecular hydrogen, ≥75 vol % of molecular hydrogen, or ≥90 vol % of molecular hydrogen.

The hydroprocessing of the tar product under the pre-treater hydroprocessing conditions can be carried out in the presence of a catalytically-effective amount of at least one catalyst having activity for hydrocarbon hydroprocessing. Illustrative catalysts can include, but are not limited to, conventional hydroprocessing catalysts such as those used in reside and/or heavy oil hydroprocessing. Illustrative catalysts can include, but are not limited to, bulk metallic catalysts and/or supported catalysts. The metals can be in elemental form or in the form of a compound. In some examples, the catalyst can be or include at least one metal from any of Groups 5 to 10 of the Periodic Table of the Elements (tabulated as the Periodic Chart of the Elements, The Merck Index, Merck & Co., Inc., 1996). Examples of such metals include, but are not limited to, copper, vanadium, chromium, molybdenum, tungsten, manganese, technetium, rhenium, iron, cobalt, nickel, ruthenium, palladium, rhodium, osmium, iridium, platinum, or mixtures thereof. Suitable conventional catalysts include one or more of RT-621, which is described as a reside conversion catalyst in Advances of Chemical Engineering 14, table XXIII, Academic Press, 1989; KF860 available from Albemarle Catalysts Company LP, Houston Tex.; NEBULA® Catalyst, such as NEBULA® 20, available from the same source; CENTERA® catalyst, available from Criterion Catalysts and Technologies, Houston Tex., such as one or more of DC-2618, DN-2630, DC-2635, and DN-3636; ASCENT® Catalyst, available from the same source, such as one or more of DC-2532, DC-2534, and DN-3531; and FCC pre-treat catalyst, such as DN3651 and/or DN3551, available from the same source.

In some examples, the catalyst can include a total amount of Groups 5 to 10 metals per gram of catalyst of ≥0.0001 grams, ≥0.001 grams, or ≥0.01 grams, where the grams are calculated on an elemental basis. For example, the catalyst can include a total amount of Group 5 to 10 metals of about 0.0001 grams, about 0.001 grams, or about 0.05 grams to about 0.08 grams, about 0.1 grams, about 0.3 grams, or about 0.6 grams. In some examples, the catalyst can also include, in addition to at least one metal from any of Groups 5 to 10, at least one Group 15 element. An example of a Group 15 element is phosphorus. When a Group 15 element is utilized, the catalyst can include a total amount of elements of Group 15 of about 0.000001 grams, about 0.00001 grams, about 0.00005 grams, or about 0.0001 grams to about 0.001 grams, about 0.03 grams, about 0.06 grams, or about 0.1 grams, where the grams are calculated on an elemental basis.

The tar product or the tar-utility fluid mixture can primarily be in the liquid phase when subjected to the pre-treater hydroprocessing conditions. For example, ≥75 wt. % of the tar product or the tar-utility fluid mixture, ≥80 wt. % of the tar product or the tar-utility fluid mixture, ≥90 wt. % of the tar product or the tar-utility fluid mixture, or ≥99 wt. % of the tar product or the tar-utility fluid mixture can be in the liquid phase when subjected to the pre-treater hydroprocessing conditions. The pre-treater hydroprocessing conditions can produce a pretreated tar product or a pretreated tar-utility fluid mixture that can include (i) a vapor portion that can include unreacted treat gas, primarily vapor products derived from the treat gas and the tar and (ii) a liquid portion that can include unreacted tar product and other products, e.g., cracked products derived from the tar product that can be produced during the pre-treater hydroprocessing conditions.

In some examples, the liquid portion and the vapor portion in the pre-treated tar product can be separated. The vapor portion can be upgraded to remove impurities, e.g., sulfur compounds and/or light paraffinic hydrocarbon, and the upgraded vapor can be re-cycled as a treat gas for use in hydroprocessing the tar product, for example. The liquid portion can be hydroprocessed under tar hydroprocessing conditions to produce the first hydroprocessed product. In other examples, the pre-treated tar product, i.e., both the vapor portion and liquid portion, can be hydroprocessed under the tar hydroprocessing conditions to produce the first hydroprocessed product. In some examples, prior to subjecting the pre-treated tar product or the liquid portion separated therefrom to the second set of hydroprocessing conditions, the pre-treated tar product or the liquid portion separated therefrom can be processed, e.g., subjected to additional solids removal processes.

The tar hydroprocessing conditions can be carried out in at least one hydroprocessing zone located in at least one tar hydroprocessing stage of a tar hydroprocessor reactor. In some examples, the tar hydroprocessor reactor can be in the form of a conventional hydroprocessing reactor. The catalyst(s) and amount(s) thereof can be selected from among the same catalysts amounts specified for use in the pre-treater hydroprocessing conditions.

The tar hydroprocessing conditions can include one or more of (a) a temperature ($T_T$) of ≥200° C. to about 500° C., (b) a weight hour space velocity ($WHSV_T$) of ≥0.2 hr$^{-1}$, ≥0.25 hr$^{-1}$, or ≥0.3 hr$^{-1}$ to about 20 hr$^{-1}$ based on a weight of the pre-treated tar product that is subjected to the tar hydroprocessing, e.g., a weight of the liquid portion of the pre-treated tar product, (c) a total pressure ($P_T$) of ≥6 MPa or ≥8 MPa to about 14 MPa, and (d) in the presence of molecular hydrogen supplied at a rate ($SR_T$) of about 150 to about 1,780, e.g., ≥534, standard cubic meters per cubic meter of the pre-treated tar product subjected to the tar hydroprocessing. In some examples, the tar hydroprocessing conditions can include one or more of (a) a $T_T$ of about 250° C., about 275° C., about 300° C., about 350° C., about 360° C., or about 375° C. to about 390° C., about 400° C., about 410° C., about 425° C., about 450° C., about 475° C., or about 500° C., (b) a $WHSV_T$ of about 0.5 hr$^{-1}$, about 0.7 hr$^{-1}$, about 0.9 hr$^{-1}$, about 1 hr$^{-1}$, 1.2 hr$^{-1}$, or about 1.5 hr$^{-1}$ to about 5 hr$^{-1}$, about 10 hr$^{-1}$, about 15 hr$^{-1}$, or about 20 hr$^{-1}$, (c) a $SR_2$ of about 534, about 550, about 575, about 600, or about 650 standard cubic meters per cubic meter of the pre-treated tar product subjected to the tar hydroprocessing to about 700, about 800, about 900, about 1,000, about 1,250, about 1,500 or about 1,750 standard cubic meters per cubic meter of the pre-treated tar product subjected to the tar hydroprocessing, and (d) a $P_T$ of ≥6 MPa or ≥8 MPa to about 10 MPa, about 12 MPa, or about 13.1 MPa. In the tar hydroprocessing conditions the molecular hydrogen can be consumed at a rate of about 62, about 80, about 100, about 125, about 150, about 250, about 285, or about 300 standard cubic meters per cubic meter of the tar product in the pre-treated tar product to about 500, about 550, about 570, about 600, or about 625 standard cubic meters per cubic meter of the tar product in the pre-treated tar product. In some examples, the tar hydroprocessing conditions can also include a molecular hydrogen partial pressure during the tar hydroprocessing of ≥2.75 MPa, ≥3.5 MPa, ≥5 MPa, ≥6 MPa, ≥8 MPa, or ≥11 MPa to about 14 MPa or less, about 13 MPa or less, or about 12 MPa or less. In some examples, the molecular hydrogen partial pressure during the tar hydroprocessing conditions can be about 14 MPa or less, about 13 MPa or less, or about 12 MPa or less.

The molecular hydrogen can be combined with the pre-treated tar product or the liquid portion separated therefrom upstream of the tar hydroprocessor and/or introduced directly to the tar hydroprocessor. In other examples, the molecular hydrogen can be cascaded from the pre-treater hydroprocessor with the pre-treated product to the tar hydroprocessor. The molecular hydrogen can be relatively pure hydrogen or can be in the form of a "treat gas" or "tail gas" that contains sufficient molecular hydrogen for use in the pre-treater hydroprocessing conditions and optionally includes other gases (e.g., nitrogen and light hydrocarbons such as methane) that generally do not adversely interfere with or affect either the reactions or the products. In some examples, the treat gas can include ≥50 vol % of molecular hydrogen, ≥75 vol % of molecular hydrogen, or ≥90 vol % of molecular hydrogen.

As noted above, in some examples, the tar product can be mixed, blended, combined, or otherwise contacted with the utility fluid product to produce a tar-utility fluid mixture and the tar-utility fluid mixture can be hydroprocessed to produce a first hydroprocessed product. In some examples, the tar product or the tar-utility fluid mixture can be hydroprocessed according to the processes and systems disclosed in U.S. Pat. Nos. 9,090,836; 9,637,694; and 9,777,227; and International Patent Application Publication No. WO 2018/111574.

In some examples, at least a hydroprocessor heavy product and the utility fluid product can be separated from the first hydroprocessed product. In other examples, the hydroprocessor heavy product, the utility fluid product, and optionally an overhead can be separated from the first hydroprocessed product. The second liquid phase product, the first hydroprocessed product, and the hydroprocessor heavy product are themselves valuable products, and can be used, e.g., as a relatively high-sulfur fuel oil (high sulfur in comparison with the first and second fuel oil products) or as a blending component thereof. Non-limiting examples of blendstocks suitable for blending with one or more of second liquid phase product, the first hydroprocessed product and the hydroprocessor heavy product include one or more of bunker fuel; burner oil; heavy fuel oil, e.g., No. 5 and No. 6 fuel oil; high-sulfur fuel oil; low-sulfur fuel oil; regular-sulfur fuel oil (RSFO); gas oil as may be obtained from the distillation of crude oil, crude oil components, and hydrocarbon derived from crude oil (e.g., coker gas oil), and the like. For example, the second liquid phase product can be used as a blending component to produce a fuel oil composition comprising <0.5 wt. % sulfur. Although the second liquid phase product and the hydroprocessor heavy product are improved products over the tar product, and are useful as fuel or blendstock "as-is", it is typically beneficial to carry out further processing.

The hydroprocessor heavy product has desirable properties, e.g., a 15° C. density that is typically ≥0.10 g/cm$^3$ less than the density of the tar product. For example, the hydroprocessor heavy product can have a density that is ≥0.12, or ≥0.14, or ≥0.15, or ≥0.17 g/cm$^3$ less than the density of the tar product. The hydroprocessor heavy product's 50° C. kinematic viscosity is typically ≤1000 cSt. For example, the viscosity of the hydroprocessor heavy product can be ≤500 cSt, e.g., ≤150 cSt, such as ≤100 cSt, or ≤75 cSt, or ≤50 cSt, or ≤40 cSt, or ≤30 cSt. Generally, the tar hydroprocessing results in a significant viscosity improvement over the pretreated tar. For example, when the 50° C. kinematic viscosity of the tar product (e.g., obtained as feed from a tar knock-out drum) is ≥1.0×10$^4$ cSt, e.g., ≥1.0×10$^5$ cSt, ≥1.0×10$^6$ cSt, or ≥1.0×10$^7$ cSt, the 50° C. kinematic viscosity of the hydroprocessor heavy product is typically ≤200 cSt, e.g., ≤150 cSt, such as ≤100 cSt, or ≤75 cSt, or ≤50 cSt, or ≤40 cSt, or ≤30 cSt. Particularly when the tar product has a sulfur content ≥1 wt. %, upstream of the pre-treater hydroprocessor, the hydroprocessor heavy product typically has a sulfur content ≥0.5 wt. %, e.g., in a range of about 0.5 wt. % to about 0.8 wt. %. In some examples, the hydroprocessor heavy product can have a sulfur content of <0.5 wt. %, such as about 0.05 wt. % to about 0.4 wt. %. In some examples, the hydroprocessor heavy product can have a density of <0.99 g/cm$^3$, a cetane value of ≥20, a CCAI of <870, a sulfur content of <0.5 wt. %, and a sediment content of <0.1 wt. %.

In some examples, the hydroprocessor heavy product can be further processed, e.g., subjected to additional hydroprocessing, to adjust or otherwise modify one or more properties thereof. The additional hydroprocessing (not shown in the figures) can be carried out under conditions (re-treater hydroprocessing conditions) that are typically more severe than those of the tar pre-treater (itself a hydroprocessor) or the tar hydroprocessor. Aromatic content of the utility fluid is not affected by the additional hydroprocessing because the utility fluid is recovered before the additional hydroprocessing. The utility fluid is not needed during the additional hydroprocessing because, e.g., the tar hydroprocessor and optionally the pre-treater sufficiently decrease the content of foulant precursors in the feed to the additional hydroprocessor. The product of such additional hydroprocessing can be the first fuel oil and/or a blending component thereof. The hydroprocessor heavy product and the utility fluid product can be separated from the first hydroprocessed product according to the processes and systems disclosed in U.S. Pat. Nos. 9,090,836; 9,637,694; 9,777,227; and International Patent Application Publication No. WO 2018/111574.

Typically, the additional hydroprocessing is carried out under re-treater hydroprocessing conditions in at least one hydroprocessing zone located in at least one re-treater hydroprocessing stage of a re-treater hydroprocessor reactor with little or no utility fluid. The re-treatment hydroprocessing conditions, which are typically more severe than the tar hydroprocessing conditions, can include a temperature ($T_R$) ≥360° C.; a space velocity (WHSV$_R$)≤0.6 hr$^{-1}$, based on the weight of hydroprocessor heavy product subjected to the re-treater hydroprocessing; a molecular hydrogen supply rate ≥2500 standard cubic feet per barrel of hydroprocessor heavy product (SCF/B) (445 S m$^3$/m$^3$); a total pressure ("$P_R$") ≥3.5 MPa, e.g., ≥6 MPa; and WHSV$_R$≤WHSV$_T$. The retreatment hydroprocessing conditions typically include $T_R$≥370° C.; e.g., in the range of from 370° C. to 415° C.; WHSV$_R$≤0.5 hr$^{-1}$, e.g., in the range of from 0.2 hr$^{-1}$ to 0.5 hr$^{-1}$; a molecular hydrogen supply rate ≥3000 SCF/B, e.g., in the range of from 3000 SCF/B (534 S m$^3$/m$^3$) to 6000 SCF/B (1068 S m$^3$/m$^3$); and a total pressure ("PR") ≥6 MPa, e.g., in the range of from 6 MPa to 13.1 MPa. Optionally, $T_R$≥$T_T$ and/or WHSV$_R$≤WHSV$_T$. One product of the additional hydroprocessing is heavy hydrocarbon comprising re-treated tar.

The re-treated hydroprocessor heavy product typically has a sulfur content ≤0.3 wt. %, e.g., ≤0.2 wt. %. Other properties of the re-treated hydroprocessor heavy product can include a hydrogen:carbon molar ratio ≥1.0, e.g., ≥1.05, such as ≥1.10, or ≥1.055; an $S_{BN}$≥185, such as ≥190, or ≥195; an $I_N$≤105, e.g., ≤100, such as ≤95; a 15° C. density ≤1.1 g/cm$^3$, e.g., ≤1.09 g/cm$^3$, such as ≤1.08 g/cm$^3$, or ≤1.07 g/cm$^3$; a flash point ≥, or ≤−35° C. Generally, the re-treated tar oil has 50° C. kinematic viscosity that is less than that of the hydroprocessor heavy product, and is typically ≤1000 cSt, e.g., ≤900 cSt, such as ≤800 cSt.

The retreating generally results in a significant improvement in in one or more of viscosity, solvent blend number, insolubility number, and density over that of the hydroprocessor heavy product fed to the retreater. Desirably, since the retreating can be carried out without utility fluid, these benefits can be obtained without utility fluid hydrogenation or cracking.

The re-treated hydroprocessor heavy product can be utilized as a fuel and/or blended with one or more blendstocks, e.g., to produce a lubricant or fuel, e.g., a transportation fuel. Suitable blendstocks include those specified for blending with the second liquid phase product, the first hydroprocessed product and the hydroprocessor heavy product. Selected conditions for the pre-treater, the tar hydroprocessor, and the re-treater, and the properties of certain products and by-products are disclosed in WO Publication No. WO2018/111574.

Returning to the first liquid phase product separated from the heated mixture, the first liquid phase product can be further processed to produce one or more additional hydrocarbon products. In some examples, the first liquid phase product can be subjected to hydroprocessing conditions to produce a hydroprocessed first liquid phase product or second hydroprocessed product. Hydroprocessing the first liquid phase product can be carried out under hydroconversion conditions, e.g., under conditions for carrying out one or more of hydrocracking (including selective hydrocracking), hydrogenation, hydrotreating, hydrodesulfurization, hydrodenitrogenation, hydrodemetallation, hydrodearomatization, hydroisomerization, or hydrodewaxing of the first liquid phase product. In some examples, the first liquid phase product can be hydroprocessed in one or more hydroprocessing units that can include one or more hydroprocessing vessels or zones. The hydroprocessing vessel or zone can include one or more catalysts disposed therein. The catalyst can be in the form of a fixed catalyst bed, a circulating or slurry bed, or any other configuration. The catalyst(s) and amount(s) thereof can be selected from among the same catalysts amounts specified for use in the pre-treater hydroprocessing set of conditions. In some examples, at least a pitch and one or more hydrocarbon products can be separated from the second hydroprocessed product. Illustrative hydrocarbon products that can be separated from the second hydroprocessed product can be or include, but are not limited to, the second fuel oil, hydrocrackate, and/or pitch. Certain properties of the second fuel oil, e.g., kinematic viscosity, sulfur content, and normal boiling range can be similar to those of the first fuel oil, and these fuel oils typically can be used for substantially the same purposes, or stored, or conducted away for further processing.

The pitch can have a Conradson carbon residue of about 15 w %, about 17 wt. %, about 20 wt. % or about 23 wt. % to about 25 wt. %, about 27 wt. %, about 30 wt. %, about 33 wt. %, or about 35 wt. %, as measured according to ASTM D482-13. The pitch can have an ° API gravity measured at a temperature of 15.8° C. of less than 5, less than 3, or less than 1, as measured according to ASTM D287-12b. In some examples, the pitch can have an ° API gravity measured at a temperature of 15.8° C. of about 0.1 to about 5. The pitch can include have a sulfur content of about 0.1 wt. %, about 0.5 wt. %, about 0.7 wt. %, about 1 wt. % or about 1.3 wt. % to about 2 wt. %, about 2.5 wt. %, about 3 wt. %, about 3.5 wt. %, or about 4 wt. %. The pitch can have a nitrogen content of about 0.1 wt. %, about 0.2 wt. %, about 0.3 wt. %, or about 0.4 wt. % to about 0.5 wt. %, about 0.6 wt. %, about 0.7 wt. %, or about 0.8 wt. %.

In some examples, the pitch and an oxidant can be reacted at conditions sufficient to produce a synthesis gas that can include, but is not limited to, molecular hydrogen and carbon monoxide. In some examples reacting the pitch and oxidant can include partially oxidizing the pitch in the presence of the oxidant and a catalyst at conditions sufficient to partially combust a portion of the pitch to produce carbon dioxide, non-combusted pitch, and heat. At least a portion of the non-combusted pitch can be reformed in the presence of the heat and the catalyst to produce the synthesis gas. In some examples, the oxidant can be or include oxygen, oxygen containing gases such as air, or a mixture thereof.

In some examples, molecular hydrogen or a molecular hydrogen-rich gas can be separated from the synthesis gas. The molecular hydrogen or molecular hydrogen-rich gas can be used to hydroprocess the tar product separated from the cooled steam cracker effluent and/or to hydroprocess the liquid phase product separated from the heated mixture that included steam and the hydrocarbon. In other examples, all or at least a portion of the molecular hydrogen or molecular hydrogen-rich gas can be used in other refinery processes that require molecular hydrogen from an external source.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, patent application publications, test procedures, and other documents cited in this application are fully incorporated by reference herein to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A process for upgrading a hydrocarbon, comprising:
   separating a vapor phase product and a liquid phase product from a heated mixture comprising steam and a hydrocarbon;
   steam cracking the vapor phase product to produce a steam cracker effluent;
   contacting the steam cracker effluent with a quench fluid to produce a cooled steam cracker effluent, wherein the steam cracker effluent is at a temperature of ≥300° C. when initially contacted with the quench fluid;
   separating a tar product and an upgraded steam cracker effluent from the cooled steam cracker effluent, wherein the upgraded steam cracker effluent comprise ethylene and propylene;
   hydroprocessing the tar product to produce a first hydroprocessed product;
   separating from the upgraded steam cracker effluent at least a process gas, a steam cracker naphtha, and a bottoms product; and
   separating a hydroprocessor heavy product and a utility fluid product from the first hydroprocessed product, wherein (i) the quench fluid comprises a first portion of the utility fluid product and (ii) the quench fluid is substantially free of the bottoms product.

2. The process of claim 1, further comprising contacting the cooled steam cracker effluent with a second portion of the utility fluid product during separation of the tar product and the process gas from the cooled steam cracker effluent, wherein the cooled steam cracker effluent is at a temperature of ≥300° C. when initially contacted with the second portion of the utility fluid product.

3. The process of claim 1, further comprising:
   hydroprocessing the liquid phase product to produce a second hydroprocessed product;
   separating a pitch and one or more hydrocarbon products from the second hydroprocessed product;
   reacting the pitch and an oxidant at conditions sufficient to produce a synthesis gas comprising a mixture of molecular hydrogen and carbon monoxide.

4. The process of claim 3, wherein reacting the pitch and the oxidant comprises:
   partially oxidizing the pitch in the presence of the oxidant and a catalyst at conditions sufficient to combust a portion of the pitch to produce a mixture comprising carbon dioxide and non-combusted pitch and heat; and
   reforming at least a portion of the non-combusted pitch in the presence of the heat and the catalyst to produce the synthesis gas.

5. The process of claim 3, wherein the tar product is hydroprocessed in the presence of molecular hydrogen separated from the synthesis gas.

6. The process of claim 3, wherein the pitch has a Conradson carbon residue of about 20 wt. % to about 30 wt. %, an ° API gravity measured at a temperature of 15.8° C. of less than 5, a sulfur content of about 1 wt. % to about 3 wt. %, and a nitrogen content of about 0.3 wt. % to about 0.6 wt. %.

7. The process of claim 1, further comprising combing a third portion of the utility fluid product with the tar product to produce a tar-utility fluid mixture, wherein the tar-utility fluid mixture is hydroprocessed to produce the first hydroprocessed product.

8. The process of claim 1, wherein the utility fluid product comprises: (a) ≥1 wt. % of 1.0 ring class compounds; (b) ≥5 wt. % 1.5 ring class compounds; (c) ≥5 wt. % of 2.0 ring class compounds; and (d) ≥0.1 wt. % of 5.0 ring class compounds, wherein the weight percent values of (a), (b), (c), and (d) are based on a weight of the utility fluid product.

9. The process of claim 1, wherein the liquid phase product comprises hydrocarbons having a minimum boiling point of about 500° C. to about 570° C., and wherein the liquid phase product is conducted away from the process and used as a fuel or a fuel blending component.

10. The process of claim 1, wherein hydroprocessing the tar product comprises hydroprocessing the tar product under pre-treater hydroprocessing conditions to produce a pre-treated tar product comprising a vapor portion and a liquid portion and hydroprocessing the pre-treated tar product under tar hydroprocessing conditions to produce the first hydroprocessed product.

11. The process of claim 10, wherein:
the pre-treater hydroprocessing conditions comprise hydroprocessing the tar product at a temperature ($T_{PT}$) of 400° C. or less, a weight hour space velocity ($WHSV_{PT}$) of ≥0.3 hr$^{-1}$ based on a weight of the tar product that is subjected to the pre-treater hydroprocessing conditions, a total pressure ($P_{PT}$) of ≥6 MPa, and in the presence of molecular hydrogen supplied at a rate ($SR_{PT}$) of less than 534 standard cubic meters per cubic meter of the tar product,
the tar hydroprocessing conditions comprise hydroprocessing the pre-treated tar product at a temperature ($T_T$) of ≥200° C., a weight hour space velocity ($WHSV_T$) of ≥0.3 hr$^{-1}$ based on a weight of the pre-treated tar product subjected to the tar hydroprocessing, a total pressure ($P_T$) of ≥6 MPa, and in the presence of molecular hydrogen supplied at a rate ($SR_T$) of ≥534 standard cubic meters per cubic meter of the pre-treated tar product subjected to the tar hydroprocessing, and $WHSV_T$ is less than $WHSV_{PT}$.

12. A process for upgrading a hydrocarbon, comprising:
separating a vapor phase product and a liquid phase product from a heated mixture comprising steam and a hydrocarbon, wherein the hydrocarbon comprises naphtha, gas oil, vacuum gas oil, waxy residues, atmospheric residues, residue admixtures, crude oil, or a mixture thereof;
exposing the vapor phase product to a temperature of ≥400° C. under steam cracking conditions to produce a steam cracker effluent that is at least partially in a gas phase;
contacting the steam cracker effluent with a quench fluid to produce a cooled steam cracker effluent, wherein the steam cracker effluent is at a temperature of ≥300° C. when initially contacted with the quench fluid, and wherein at least a portion of the gas phase condenses into a liquid;
separating a tar product and an upgraded steam cracker effluent from the cooled steam cracker effluent, wherein the upgraded steam cracker effluent comprises ethylene and propylene;
separating from the upgraded steam cracker effluent at least a process gas, a steam cracker naphtha, and a bottoms product; wherein the bottoms product is conducted away from the process;
hydroprocessing the tar product to produce a first hydroprocessed product; and
separating a hydroprocessor heavy product and a utility fluid product from the first hydroprocessed product, wherein the quench fluid comprises a first portion of the utility fluid product, wherein the utility fluid product comprises: (a) ≥1 wt. % of 1.0 ring class compounds; (b) ≥5 wt. % of 1.5 ring class compounds; (c) ≥5 wt. % of 2.0 ring class compounds; and (d) ≥0.1 wt. of 5.0 ring class compounds, wherein the weight percent values of (a), (b), (c), and (d) are based on a weight of the utility fluid product, and wherein the cooled steam cracker effluent comprises about 5 wt. % to about 80 wt. % of the utility fluid, based on a combined weight of the quench fluid and the steam cracker effluent.

13. The process of claim 12, further comprising contacting the cooled steam cracker effluent with a second portion of the utility fluid product during separation of the tar product and the process gas from the cooled steam cracker effluent, wherein the cooled steam cracker effluent is at a temperature of ≥325° C. when initially contacted with the second portion of the utility fluid.

14. The process of claim 12, further comprising:
separating a second vapor phase product comprising molecular hydrogen from the first hydroprocessed product; and
contacting the steam cracker naphtha with the molecular hydrogen in the second vapor phase product and a catalyst under hydroprocessing conditions sufficient to produce a stabilized steam cracker naphtha.

15. The process of claim 12, further comprising:
hydroprocessing the liquid phase product to produce a second hydroprocessed product;
separating a pitch and one or more hydrocarbon products from the second hydroprocessed product, wherein the pitch has a Conradson carbon residue of about 20 wt. % to about 30 wt. %, an ° API gravity measured at a temperature of 15.8° C. of less than 5, a sulfur content of about 1 wt. % to about 3 wt. %, and a nitrogen content of about 0.3 wt. % to about 0.6 wt. %;
reacting the pitch and oxygen at conditions sufficient to produce a synthesis gas comprising a mixture of molecular hydrogen and carbon monoxide.

16. The process of claim 12, wherein at least one of the tar product and the liquid phase product is hydroprocessed in the presence of molecular hydrogen separated from the synthesis gas.

17. The process of claim 12, further comprising combing a third portion of the utility fluid product with the tar product to produce a tar-utility fluid mixture, wherein the tar-utility fluid mixture is hydroprocessed to produce the first hydroprocessed product.

18. The process of claim 12, wherein hydroprocessing the tar product comprises hydroprocessing the tar product under pre-treater hydroprocessing conditions to produce a pre-treated tar product comprising a vapor portion and a liquid portion and hydroprocessing the pre-treated tar product under tar hydroprocessing conditions to produce the first hydroprocessed product, and wherein:
the pre-treater hydroprocessing conditions comprise hydroprocessing the tar product at a temperature ($T_{PT}$) of 400° C. or less, a weight hour space velocity ($WHSV_{PT}$) of ≥0.3 hr$^{-1}$ based on a weight of the tar product that is subjected to the pre-treater hydroprocessing conditions, a total pressure ($P_{PT}$) of ≥6 MPa, and in the presence of molecular hydrogen supplied at a rate ($SR_{PT}$) of less than 534 standard cubic meters per cubic meter of the tar product,
the tar hydroprocessing conditions comprise hydroprocessing the pre-treated tar product at a temperature ($T_T$) of ≥200° C., a weight hour space velocity ($WHSV_T$) of ≥0.3 hr$^{-1}$ based on a weight of the pre-treated tar product subjected to the tar hydroprocessing, a total pressure ($P_T$) of ≥6 MPa, and in the presence of molecular hydrogen supplied at a rate ($SR_T$) of ≥534 standard cubic meters per cubic meter of the pre-treated tar product subjected to the tar hydroprocessing, and $WHSV_T$ is less than $WHSV_{PT}$.

19. The process of claim 18, wherein:
$T_{PT}$ is about 220° C. to about 300° C.,
$WHSV_{PT}$ is about 1.5 hr$^{-1}$ to about 3.5 hr$^{-1}$,
$SR_{PT}$ is about 53 standard cubic meters per cubic meter of the hydroprocessed portion of the tar product to about 178 standard cubic meters per cubic meter of the tar product, $P_{PT}$ is ≥6 MPa to about 13.1 MPa, in the pre-treater hydroprocessing conditions the molecular hydrogen is consumed at a rate of about 18 standard cubic meters per cubic meter of the tar product to about 107 standard cubic meters per cubic meter of the tar product, $T_T$ is about 360° C. to about 410° C., $WHSV_T$ is about 0.5 hr$^{-1}$ to about 1.2 hr$^{-1}$, $SR_T$ is about 534 standard cubic meters per cubic meter of the pre-treated tar product subjected to the tar hydroprocessing to about 890 standard cubic meters per cubic meter of the pre-treated tar product subjected to the tar hydroprocessing, $P_T$ is ≥6 MPa to about 13.1 MPa, and in the tar hydroprocessing conditions the molecular hydrogen is consumed at a rate of about 285 standard cubic meters per cubic meter of the tar product in the pre-treated tar product to about 570 standard cubic meters per cubic meter of the tar product in the pre-treated tar product.

20. The process of claim 12, wherein the liquid phase product comprises hydrocarbons having a minimum boiling point of about 500° C. to about 570° C.

21. A system for upgrading a hydrocarbon, comprising:
a steam cracker configured to indirectly heat a mixture comprising steam and a hydrocarbon to produce a heated mixture and to steam crack a vapor phase product separated from the heated mixture to produce a steam cracker effluent;
a first separator configured to separate the vapor phase product and a liquid phase product from the heated mixture;
a first transfer line configured to introduce a first portion of a utility fluid product to the steam cracker effluent at a location where the steam cracker effluent is at a temperature of ≥300° C. to produce a cooled steam cracker effluent;
a second separator configured to separate a tar product and a process gas comprising ethylene and propylene from the cooled steam cracker effluent;
a first hydroprocessing unit configured to hydroprocess the tar product to produce a first hydroprocessed product;
a third separator configured to separate a second vapor phase product and a second liquid phase product from the first hydroprocessed product; and
a fourth separator configured to separate a hydroprocessor heavy product and the utility fluid product from the second liquid phase product.

22. The system of claim 21, further comprising:
a second hydroprocessing unit configured to hydroprocess the liquid phase to produce a second hydroprocessed product;
a fifth separator configured to separate a pitch and one or more hydrocarbon products from the second hydroprocessed product; and
a reactor configured to react the pitch and an oxidant at conditions sufficient to produce a synthesis gas comprising a mixture of molecular hydrogen and carbon monoxide.

23. The system of claim 21, wherein:
the second separator is configured to separate a steam cracker naphtha from the cooled steam cracker effluent,
the second vapor phase product comprises molecular hydrogen, and
a third hydroprocessing unit is configured to hydroprocess the steam cracker naphtha in the presence of the molecular hydrogen in the second vapor phase product to produce a stabilized steam cracker naphtha.

24. The system of claim 21, further comprising a second transfer line configured to introduce a second portion of the utility fluid product into the second separator such that the second portion of the utility fluid product contacts the cooled steam cracker effluent during separation of the tar product and the process gas at a location where the steam cracker effluent is at a temperature of ≥300° C.

25. A hydrocarbon upgrading process, comprising:
separating a vapor phase product and a liquid phase product from a heated mixture comprising steam and a hydrocarbon, wherein the hydrocarbon comprises naphtha, gas oil, vacuum gas oil, waxy residues, atmospheric residues, residue admixtures, crude oil, or a mixture thereof;
exposing the vapor phase product to a temperature of ≥400° C. under steam cracking conditions to produce a steam cracker effluent that is at least partially in a gas phase;
contacting the steam cracker effluent with a quench fluid to produce a cooled steam cracker effluent, wherein at least a portion of the gas phase condenses into a liquid phase;
separating a tar product and an upgraded steam cracker effluent from the cooled steam cracker effluent;
separating from the upgraded steam cracker effluent at least a process gas, a steam cracker naphtha, and a bottoms product; wherein the bottoms product is conducted away from the process;
hydroprocessing the tar product under pre-treater hydroprocessing conditions to produce a pre-treated tar product comprising a vapor portion and a liquid portion and hydroprocessing the pre-treated tar product under tar hydroprocessing conditions to produce a first hydroprocessed product, wherein:
the pre-treater hydroprocessing conditions comprise hydroprocessing the tar product at a temperature ($T_{PT}$) of 400° C. or less, a weight hour space velocity ($WHSV_{PT}$) of ≥0.3 hr$^{-1}$ based on a weight of the tar product subjected to the pre-treater hydroprocessing conditions, a total pressure ($P_{PT}$) of ≥6 MPa, and in the presence of molecular hydrogen supplied at a rate ($SR_{PT}$) of less than 534 standard cubic meters per cubic meter of the tar product,
the tar hydroprocessing conditions comprise hydroprocessing the pre-treated tar product at a temperature ($T_T$) of ≥200° C., a weight hour space velocity ($WHSV_T$) of ≥0.3 hr$^{-1}$ based on a weight of the pre-treated tar product that is subjected to the tar hydroprocessing, a total pressure ($P_T$) of ≥6 MPa, and in the presence of molecular hydrogen supplied at a rate ($SR_T$) of ≥534 standard cubic meters per cubic meter of the pre-treated tar product subjected to the tar hydroprocessing, and
$WHSV_T$ is less than $WHSV_{PT}$;
separating a hydroprocessor heavy product and a utility fluid product from the first hydroprocessed product, wherein the quench fluid comprises a first portion of the utility fluid product, wherein the utility fluid product comprises: (a) ≥1 wt. % of 1.0 ring class compounds; (b) ≥5 wt. % of 1.5 ring class compounds; (c) ≥5 wt. % of 2.0 ring class compounds; and (d) ≥0.1 wt. % of 5.0 ring class compounds, wherein the weight percent values of (a), (b), (c), and (d) are based on a weight of the utility fluid product, and wherein the cooled steam cracker effluent comprises about 5 wt. % to about 80 wt. % of the utility fluid, based on a combined weight of the quench fluid and the steam cracker effluent;

hydroprocessing the liquid phase product to produce a second hydroprocessed product;

separating a pitch and one or more hydrocarbon products from the second hydroprocessed product, wherein the pitch has a Conradson carbon residue of about 20 wt. % to about 30 wt. %, an ° API gravity measured at a temperature of 15.8° C. of less than 5, a sulfur content of about 1 wt. % to about 3 wt. %, and a nitrogen content of about 0.3 wt. % to about 0.6 wt. %; and reacting the pitch and oxygen at conditions sufficient to produce a synthesis gas comprising a mixture of molecular hydrogen and carbon monoxide, wherein at least one of the tar product and the liquid phase product is hydroprocessed in the presence of molecular hydrogen separated from the synthesis gas.

\* \* \* \* \*